(12) United States Patent
Mankoff

(10) Patent No.: US 12,328,346 B2
(45) Date of Patent: Jun. 10, 2025

(54) MODIFYING SIGNAL ASSOCIATIONS IN COMPLEX COMPUTING NETWORKS

(71) Applicant: Jeffrey W. Mankoff, Dallas, TX (US)

(72) Inventor: Jeffrey W. Mankoff, Dallas, TX (US)

( * ) Notice: Subject to any disclaimer, the term of this patent is extended or adjusted under 35 U.S.C. 154(b) by 0 days.

(21) Appl. No.: 18/624,933

(22) Filed: Apr. 2, 2024

(65) Prior Publication Data
US 2024/0251000 A1    Jul. 25, 2024

Related U.S. Application Data

(63) Continuation of application No. 16/995,326, filed on Aug. 17, 2020, now abandoned, which is a continuation of application No. 16/278,090, filed on Feb. 16, 2019, now Pat. No. 10,749,915, which is a continuation of application No. 15/147,884, filed on May 5, 2016, now Pat. No. 10,341,395, and a
(Continued)

(51) Int. Cl.
| | |
|---|---|
| *H04L 29/06* | (2006.01) |
| *G06F 16/22* | (2019.01) |
| *G06N 20/00* | (2019.01) |
| *G06Q 20/20* | (2012.01) |
| *G06Q 20/40* | (2012.01) |
| *H04L 65/1073* | (2022.01) |
| *H04L 67/12* | (2022.01) |
| *H04L 67/75* | (2022.01) |

(52) U.S. Cl.
CPC .......... *H04L 65/1073* (2013.01); *G06F 16/22* (2019.01); *G06N 20/00* (2019.01); *G06Q 20/202* (2013.01); *G06Q 20/4014* (2013.01); *H04L 67/12* (2013.01); *H04L 67/75* (2022.05)

(58) Field of Classification Search
None
See application file for complete search history.

(56) References Cited

U.S. PATENT DOCUMENTS

| | | | |
|---|---|---|---|
| 3,574,325 | A | 4/1971 | Agarwal |
| 4,845,394 | A | 7/1989 | Kleinhans |

(Continued)

FOREIGN PATENT DOCUMENTS

| | | |
|---|---|---|
| KR | 1020070092773 A | 9/2007 |
| KR | 1020090038744 A | 4/2009 |

OTHER PUBLICATIONS

Meet Giftly: A gift card company with actual tech cred, https://gigaom.com/2011/10/30/giftly/, Colleen Taylor, Oct. 30, 2011, 1 pg.
(Continued)

*Primary Examiner* — Natisha D Cox
(74) *Attorney, Agent, or Firm* — Burdick Patents, P.A.; Sean D. Burdick; Colin L. Honan

(57) ABSTRACT

Described are methods and systems for registering consumers with merchant loyalty or other merchant programs by using a credit card or other form of payment to register the consumer, and thereafter automatically recognizing the consumer as a member in the program based on subsequent purchases made using the form of payment. This disclosure is also directed to an apparatus and related methods for modifying a temporal signal association in a complex computing network such that a future computing operation is executed based on the modified signal association.

20 Claims, 14 Drawing Sheets

Related U.S. Application Data continuation-in-part of application No. 15/076,876, filed on Mar. 22, 2016, now abandoned, which is a continuation-in-part of application No. 14/794,593, filed on Jul. 8, 2015, now abandoned, which is a continuation-in-part of application No. 13/937,132, filed on Jul. 8, 2013, now abandoned, which is a continuation of application No. 13/708,814, filed on Dec. 7, 2012, now Pat. No. 8,484,078, said application No. 15/147,884 is a continuation-in-part of application No. 13/231,946, filed on Sep. 13, 2011, now abandoned.

(60) Provisional application No. 61/568,637, filed on Dec. 8, 2011, provisional application No. 61/382,464, filed on Sep. 13, 2010.

(56) References Cited

U.S. PATENT DOCUMENTS

| | | |
|---|---|---|
| 5,845,389 A | 12/1998 | Roberts et al. |
| 5,995,102 A | 11/1999 | Rosen et al. |
| 6,211,587 B1 | 4/2001 | Enomoto et al. |
| 6,300,693 B1 | 10/2001 | Poag et al. |
| 6,407,474 B1 | 6/2002 | Mahn et al. |
| 6,452,294 B1 | 9/2002 | Vandervort et al. |
| 6,515,384 B1 | 2/2003 | Kikuchi et al. |
| 6,727,611 B2 | 4/2004 | Bostwick |
| 6,787,950 B2 | 9/2004 | Heim |
| 6,856,053 B2 | 2/2005 | LeFlem et al. |
| 7,157,818 B2 | 1/2007 | Jones |
| 7,160,086 B2 | 1/2007 | Maceyka et al. |
| 7,403,907 B1 | 7/2008 | Gerken, III et al. |
| 7,538,457 B2 | 5/2009 | Holmes et al. |
| 7,566,999 B2 | 7/2009 | Neal |
| 7,591,147 B2 | 9/2009 | Masoudipour et al. |
| 7,692,356 B2 | 4/2010 | Bott et al. |
| 7,768,166 B2 | 8/2010 | Lafontaine et al. |
| 7,888,828 B2 | 2/2011 | Takahashi et al. |
| 7,928,348 B2 | 4/2011 | Neal |
| 7,952,240 B2 | 5/2011 | Takenaka et al. |
| 8,011,577 B2 | 9/2011 | Mullen et al. |
| 8,080,908 B2 | 12/2011 | Matsubara et al. |
| 8,080,909 B2 | 12/2011 | Perkins |
| 8,093,770 B1 | 1/2012 | Berhan |
| 8,138,640 B2 | 3/2012 | Urano et al. |
| 8,198,762 B2 | 6/2012 | Gagnon |
| 8,290,858 B1 | 10/2012 | Ankarath |
| 8,380,177 B2 | 2/2013 | Laracey |
| 8,405,262 B1 | 3/2013 | Beatty et al. |
| 8,766,497 B2 | 7/2014 | Goto et al. |
| 8,963,384 B2 | 2/2015 | Kirkley, Jr. et al. |
| 8,970,073 B2 | 3/2015 | Miyamoto et al. |
| 9,419,499 B2 | 8/2016 | Matsui et al. |
| 9,438,082 B2 | 9/2016 | Kurono et al. |
| 9,768,658 B2 | 9/2017 | Bulatow |
| 9,881,019 B2 | 1/2018 | Matsuo |
| 9,897,190 B2 | 2/2018 | Yu |
| 9,935,534 B2 | 4/2018 | Vollmer |
| 2002/0153784 A1 | 10/2002 | Kanppenberger |
| 2004/0128241 A1 | 7/2004 | Akama |
| 2004/0260605 A1 | 12/2004 | McIntyre et al. |
| 2005/0021401 A1 | 1/2005 | Postrel |
| 2005/0182648 A1 | 8/2005 | Shaw et al. |
| 2006/0020542 A1 | 1/2006 | Litle et al. |
| 2006/0271462 A1 | 11/2006 | Harmon |
| 2007/0022048 A1 | 1/2007 | Kingsborough et al. |
| 2007/0085825 A1 | 4/2007 | Geffin et al. |
| 2007/0168266 A1 | 7/2007 | Questembert |
| 2008/0035399 A1 | 2/2008 | Murata et al. |
| 2008/0042498 A1 | 2/2008 | Beer |
| 2008/0042502 A1 | 2/2008 | VanLuik et al. |
| 2008/0059379 A1 | 3/2008 | Ramaci et al. |
| 2008/0071587 A1 | 3/2008 | Granucci et al. |
| 2008/0143203 A1 | 6/2008 | Purvines et al. |
| 2008/0189188 A1 | 8/2008 | Morgenstern |
| 2008/0207203 A1 | 8/2008 | Arthur et al. |
| 2009/0086693 A1 | 4/2009 | Kennedy |
| 2009/0094134 A1 | 4/2009 | Toomer et al. |
| 2009/0119174 A1 | 5/2009 | Pfister |
| 2009/0159690 A1 | 6/2009 | Mullen et al. |
| 2009/0159698 A1 | 6/2009 | Mullen et al. |
| 2009/0287562 A1 | 11/2009 | Bosch et al. |
| 2010/0010918 A1 | 1/2010 | Hunt |
| 2010/0045125 A1 | 2/2010 | Takenaka et al. |
| 2010/0106570 A1 | 4/2010 | Radu et al. |
| 2010/0114731 A1 | 5/2010 | Kingston et al. |
| 2010/0121764 A1 | 5/2010 | Niedermeyer |
| 2010/0245186 A1 | 9/2010 | Kojima |
| 2010/0257040 A1 | 10/2010 | Hunt |
| 2011/0087530 A1 | 4/2011 | Fordyce, III et al. |
| 2011/0106698 A1* | 5/2011 | Isaacson ............... G06Q 30/02 705/41 |
| 2011/0208576 A1 | 8/2011 | Durgin et al. |
| 2011/0215660 A1 | 9/2011 | Goto et al. |
| 2011/0246284 A1 | 10/2011 | Chaikin et al. |
| 2011/0288923 A1 | 11/2011 | Steinert et al. |
| 2011/0295719 A1 | 12/2011 | Chen et al. |
| 2011/0302083 A1 | 12/2011 | Bhinder |
| 2011/0313918 A1 | 12/2011 | Lawson et al. |
| 2012/0011280 A1 | 1/2012 | Gilboa |
| 2012/0011445 A1 | 1/2012 | Gilboa |
| 2012/0029997 A1 | 2/2012 | Khan et al. |
| 2012/0032543 A1 | 2/2012 | Chakraborty et al. |
| 2012/0062056 A1 | 3/2012 | Bradfield |
| 2012/0066041 A1 | 3/2012 | Mankoff |
| 2012/0066093 A1 | 3/2012 | Carpenter |
| 2012/0091838 A1 | 4/2012 | Miyamoto et al. |
| 2012/0151371 A1 | 6/2012 | Kominac et al. |
| 2012/0166270 A1* | 6/2012 | Coppinger ......... G06Q 30/0239 705/14.36 |
| 2012/0173431 A1* | 7/2012 | Ritchie ............... G06Q 20/367 705/65 |
| 2012/0242178 A1 | 9/2012 | Miyamoto et al. |
| 2012/0317236 A1 | 12/2012 | Abdo et al. |
| 2013/0018939 A1 | 1/2013 | Chawla et al. |
| 2013/0080239 A1 | 3/2013 | Okerlund |
| 2013/0117094 A1 | 5/2013 | Jones et al. |
| 2013/0117126 A1 | 5/2013 | Coppinger |
| 2013/0159085 A1 | 6/2013 | Mankoff et al. |
| 2013/0254330 A1 | 9/2013 | Maylander et al. |
| 2013/0297395 A1 | 11/2013 | Mankoff et al. |
| 2013/0342049 A1 | 12/2013 | Stridsberg |
| 2014/0100929 A1* | 4/2014 | Burgess ............... G06Q 30/02 705/14.17 |
| 2014/0114860 A1 | 4/2014 | Ozvat et al. |
| 2014/0117796 A1 | 5/2014 | Kassler |
| 2014/0172574 A1 | 6/2014 | Iriyama |
| 2014/0236696 A1 | 8/2014 | Robinson, Jr. et al. |
| 2014/0265663 A1 | 9/2014 | Chamberlin et al. |
| 2014/0265670 A1 | 9/2014 | Chamberlin et al. |
| 2014/0354090 A1 | 12/2014 | Chamberlin |
| 2014/0372509 A1 | 12/2014 | Fausak et al. |
| 2015/0088753 A1 | 3/2015 | Van Der Schueren |
| 2015/0154587 A1 | 6/2015 | Chetty |
| 2015/0156203 A1 | 6/2015 | Giura et al. |
| 2015/0178701 A1 | 6/2015 | Glass et al. |
| 2015/0215371 A1 | 7/2015 | Zamir |
| 2015/0217632 A1 | 8/2015 | Lebeau et al. |
| 2015/0280525 A1 | 10/2015 | Rippel et al. |
| 2015/0280526 A1 | 10/2015 | Chamberlin et al. |
| 2015/0310477 A1 | 10/2015 | Mankoff |
| 2015/0365500 A1 | 12/2015 | Liverance et al. |
| 2015/0371254 A1 | 12/2015 | Pugh et al. |
| 2016/0006302 A1 | 1/2016 | Gugel et al. |
| 2016/0006803 A1 | 1/2016 | Kumar |
| 2016/0140526 A1 | 5/2016 | Cummins et al. |
| 2016/0180368 A1 | 6/2016 | Booth |
| 2016/0225008 A1 | 8/2016 | Song et al. |
| 2016/0275537 A1 | 9/2016 | Yamano |
| 2016/0308414 A1 | 10/2016 | Takahashi |
| 2016/0343018 A1 | 11/2016 | Balk |
| 2017/0012504 A1 | 1/2017 | Sever |

(56) References Cited

U.S. PATENT DOCUMENTS

| | | |
|---|---|---|
| 2017/0025911 A1 | 1/2017 | Jewell et al. |
| 2017/0103408 A1 | 4/2017 | Mazuera |
| 2017/0114860 A1 | 4/2017 | Yamauchi et al. |
| 2017/0228725 A1 | 8/2017 | Jordan et al. |
| 2017/0267055 A1 | 9/2017 | Hanumalagutti et al. |
| 2017/0271940 A1 | 9/2017 | Hanumalagutti et al. |
| 2017/0271954 A1 | 9/2017 | Hanumalagutti et al. |
| 2017/0279897 A1 | 9/2017 | Mankoff |
| 2017/0288506 A1 | 10/2017 | Asagara et al. |
| 2017/0324786 A1 | 11/2017 | Mankoff |
| 2018/0062456 A1 | 3/2018 | Sung et al. |
| 2018/0268434 A1 | 9/2018 | Watase et al. |

OTHER PUBLICATIONS

"Peppercoin Unveils Small Payments Loyalty Platform", Waltham, Mass., dated Jun. 12, 2006, PR Newswire, 2 pgs.

Definition of "register", downloaded May 11, 2013 from http://www.merriam-webster.com/thesaurus/register[verb].

PCI Security Standards Council, "Information Supplement : PCI DSS Tokenization Guidelines", Aug. 2011, 23 pgs.

\* cited by examiner

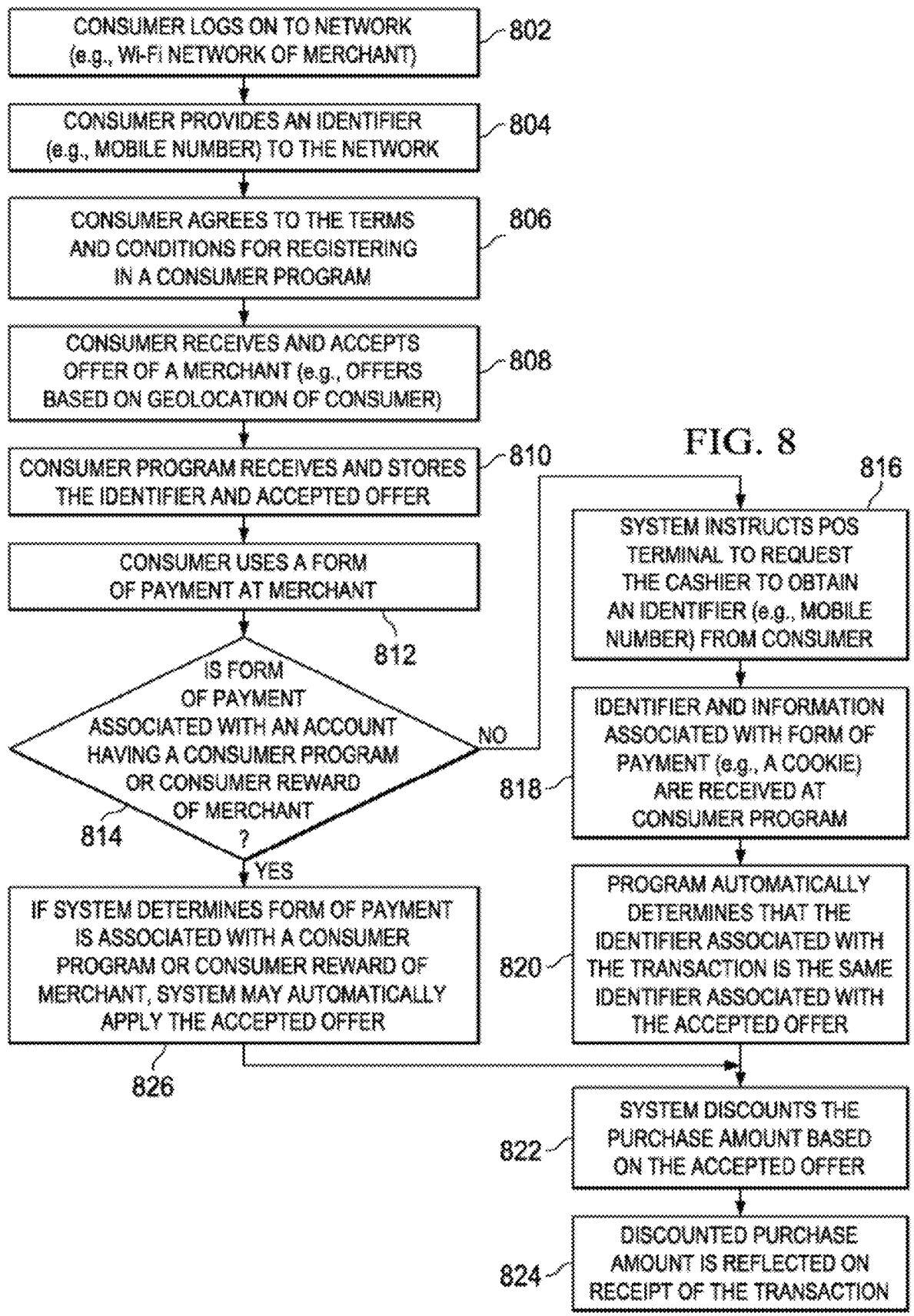

MODIFYING SIGNAL ASSOCIATIONS IN COMPLEX COMPUTING NETWORKS

RELATED APPLICATIONS

This disclosure is a continuation of U.S. application Ser. No. 16/995,326, filed Aug. 17, 2020, which is a continuation of U.S. application Ser. No. 16/278,090, filed Feb. 16, 2019, now U.S. Pat. No. 10,749,915 issued Aug. 18, 2020, which is a continuation of U.S. application Ser. No. 15/147,884, filed May 5, 2016, now U.S. Pat. No. 10,341,395 issued Jul. 2, 2019, which is a continuation-in-part of U.S. application Ser. No. 13/231,946, filed Sep. 13, 2011, now abandoned, which claims the benefit of U.S. provisional application Ser. No. 61/382,464, filed Sep. 13, 2010. U.S. application Ser. No. 16/278,090 is also a continuation-in-part of U.S. application Ser. No. 15/076,876, filed Mar. 22, 2016, now abandoned, which is a continuation-in-part of U.S. application Ser. No. 14/794,593, filed Jul. 8, 2015, now abandoned, which is a continuation-in-part of U.S. application Ser. No. 13/937,132, filed Jul. 8, 2013, now abandoned, which is a continuation of Ser. No. 13/708,814, filed Dec. 7, 2012, now U.S. Pat. No. 8,484,078 issued Jul. 9, 2013, which claims the benefit of U.S. provisional application No. 61/568,637, filed Dec. 8, 2011.

TECHNICAL FIELD

The principles disclosed herein relate generally to consumer programs, and more particularly to registering consumers in a consumer program while accessing a network. This disclosure is also directed to modifying temporal signal associations in complex computing networks.

BACKGROUND

On many occasions, consumers may find it desirable to enroll in a consumer program to receive consumer rewards for purchases made at the consumer's favorite online and/or brick-and-mortar merchant stores. In these and other cases, it is often undesirable to carry additional cards or coupons to receive the benefit of brick-and-mortar stores. Gift cards, loyalty cards, and coupons are inconvenient for the recipient as well, in that consumers' wallets are overstuffed with cards and coupons that rarely get used. The recipient must remember to bring the gift card with him to redeem the gift card. Also, often times the gift card has an unknown balance on it. These cards can also be lost and/or expire. With respect to online merchants, it is often undesirable to enroll in separate consumer programs with respect to each online merchant, such that a consumer must not only enroll for each merchant, but the consumer must also remember a particular username and password for each merchant's consumer program. These and other drawbacks exist to the aforementioned, as well as other alternatives to consumer programs and coupons. The present inventors believe that there is a market to use the form of payment made by a consumer at a merchant's store (online and/or brick-and-mortar) to initially register the consumer in a consumer program associated with the merchant's store by linking the consumer's form of payment to the consumer program, such that the merchant can automatically identify the consumer as a member in the consumer program (and the consumer can automatically receive the benefits of the consumer program) when future purchases are made at the merchant by the consumer using a form of payment associated with the consumer. There is also a need for seamlessly changing a temporal association of a signal in a complex computing network, and there is a need for intelligent computing operation execution based on modified signal association.

BRIEF SUMMARY

Disclosed are methods and systems for converting a consumer into a consumer program member of merchant by using the form of payment to register consumer in consumer program and automatically recognize consumer as a member in consumer program based on subsequent purchases made at merchant using form of payment, in which consumer rewards are automatically applied during the purchase transactions. By intercepting the data associated with the form of payment at the payment system in real-time, the present disclosure allows for consumers to register with a consumer program using forms of payment that consumers typically use to purchase products. Thus, the present disclosure allows for consumers to seamlessly and transparently gain the benefits of consumer programs merely by purchasing goods and services using forms of payment, without consumers needing to carry additional cards or coupons or login information. The present disclosure allows for consumers to seamlessly register in a consumer program either by accessing a network that can provide targeted offers to the consumer, at the point of sale, using an activation code, or using a communication request.

The present disclosure provides several important technical advantages that will be readily apparent to one skilled in the art from the following figures, descriptions, and claims. Moreover, while specific advantages have been enumerated above, various embodiments may include all, some, or none of the enumerated advantages.

In some embodiments, an apparatus is provided for modifying a temporal signal association in a complex computing network such that a future computing operation is intelligently executed based on the modified signal association. The apparatus may perform the functions of: determining association of a movable matching signal with a first signal; receiving registration of a second signal with the signal matching server; in response to receiving the registration of the second signal with the signal matching server, disassociating the matching signal from the first signal and associating the matching signal to the second signal, wherein: a computing operation is executed using the second signal; in response to determining the computing operation executed using the second signal, a determination is made whether a matching signal is associated with the second signal; and in response to determining the matching signal is associated with the second signal, the computing operation is executed based on at least one of the matching signal and the second signal.

In some embodiments, a computing operation is executed using the first signal; in response to determining the computing operation executed using the first signal, a determination is made whether a matching signal is associated with the first signal; and in response to determining the matching signal is not associated with the first signal, the computing operation is executed based on the first signal.

In some embodiments, notification of the matching signal is transmitted from a computing system associated with the first signal to a computing system associated with the second signal.

In some embodiments, in response to determining the computing operation is executed based on the matching signal and the second signal, transmitting a provisioning signal to a system associated with the first signal or associating the provisioning signal with the first signal.

In some embodiments, the provisioning signal comprises a second movable matching signal.

In some embodiments, the first signal or the second signal comprises an identification signal.

In some embodiments, the first signal or the second signal is at least one of not movable and not temporal.

In some embodiments, the computing operation is a real-time computing operation conducted at an input signal system comprising a real-time sensor.

In some embodiments, the matching signal is associated with a specific resource, and wherein a determination is made, at the input signal system, whether a signal associated with the specific resource matches the matching signal.

In some embodiments, the computing operation is executed based on the matching signal and the second signal if the signal associated with the specific resource matches the matching signal.

In some embodiments, the computing operation is executed based on the second signal, and not the matching signal if the signal associated with the specific resource does not match the matching signal.

In some embodiments, the first signal and the second signal are registered with a signal matching server.

In some embodiments, the matching signal is disassociated from the second signal upon execution of the computing operation in response to determining an attribute associated with the matching signal is extinguished.

In some embodiments, prior to the registration of the second signal with the signal matching server, the matching signal is pre-associated with the second signal.

In some embodiments, notification of the pre-association is communicated to a computing system associated with the second signal.

In some embodiments, the apparatus is further for determining whether the second signal is registered with the signal matching server; and in response to determining the second signal is not registered with the signal matching server, receiving registration of the second signal to the signal matching server.

In some embodiments, the computing operation affects an attribute of at least one of the matching signal and the second signal. In some embodiments, the computing operation affects an attribute of the first signal.

In some embodiments, an apparatus is provided for real-time routing of an input signal received from a real-time sensor to perform disparate computing operations in a complex computing network, wherein but for the real-time routing of the input signal, which are necessarily rooted in computing technology, separate input signals would be needed for performing the disparate computing operations. The apparatus comprises a signal communication interface for: establishing a first connection to an input signal system, wherein the input signal system comprises a real-time sensor for sensing an input signal and transmitting the input signal on a first connection and a second connection, wherein the input signal comprises an identification signal (or is associated with the identification signal or is associated with a separately transmitted identification signal), wherein the input signal transmitted on the first connection is used for executing a first computing operation, and wherein the input signal transmitted on the second connection is used for executing a second computing operation; receiving the input signal and/or the identification signal on the first connection; establishing a third connection to an identification database; and accessing, on the third connection, records in the identification database.

In some embodiments, the apparatus further comprises a gateway processor for executing the first computing operation, the first computing operation comprising comparing the identification signal associated with the input signal to a record in the identification database; determining whether the identification signal matches a record in the identification database; in response to determining the identification signal does not match a record in the identification database, transmitting to the input signal system, a request for creating a record for the identification signal in the identification database; and in response to transmitting the request for creating a record for the identification signal in the identification database, receiving a second signal from the input signal system or the real-time sensor, the second signal comprising a response to the request for creating a record for the identification signal in the identification database, wherein the input signal transmitted on the second connection is received by an operations processor that executes the second computing operation.

In some embodiments, the transmission, to the input signal system or the real-time sensor, of the request for creating a record for the identification signal in the identification database is further based on a location of the real-time sensor.

In some embodiments, the transmission, to the input signal system or the real-time sensor, of the request for creating a record for the identification signal in the identification database is further based on an attribute of the second computing operation.

In some embodiments, the signal communication interface is further used for establishing a fourth connection to a programming processor, wherein the programming processor transmits a trigger signal that causes sensing of the input signal at the real-time sensor.

In some embodiments, the apparatus further comprises an application programming interface for communicating with the programming processor.

In some embodiments, the input signal is received from a computing device.

In some embodiments, the input signal is received from a mobile computing device.

In some embodiments, the input signal is received from a mobile non-computing device.

In some embodiments, an apparatus is provided for modifying a temporal data association in a complex computing network such that a computing operation is executed based on the modified data association. The apparatus performs the functions of: determining association of movable operation data with first data; determining registration of second data with a data operation server; in response to determining the registration of the second data with the data operation server, disassociating the movable operation data from the first data and associating the movable operation data with the second data, wherein: a computing operation is initiated using the second data; in response to determining the computing operation is initiated using the second data, a determination is made whether operation data is associated with the second data; and in response to determining the movable operation data is associated with the second data, the computing operation is executed based on the movable operation data and/or the second data, wherein, upon execution of the computing operation, the movable operation data is disassociated from the second data, or rendered inoperable for a future computing operation, based on determining an attribute associated with the movable operation data is extinguished, wherein the computing operation is a substantially real-time computing operation initiated at an input data system comprising a substantially real-time sensor, wherein: a second computing operation is initiated using the first data, in response to determining the second computing operation is initiated using the first data, a determination is made whether operation data is associated with the first data, and in response to determining the movable operation data is not associated with the first data, the second computing operation is executed based on the first data, and not based on the movable operation data, wherein the second computing operation is a second substantially real-time computing operation initiated at a second input data system comprising a second substantially real-time sensor, and wherein the first data and the second data are storable.

In some embodiments, an apparatus is provided for associating or disassociating signals associated with execution of substantially real-time computing operations in a complex computing network. The apparatus is configured or operable for: determining a first substantially real-time computing operation initiated, based at least partially on a first signal, at a first input signal system comprising a first substantially real-time sensor; in response to determining the first substantially real-time computing operation is initiated based at least partially on the first signal, determining whether the first signal is registered with the signal server; in response to determining the first signal is not registered with the signal server, transmitting, to the first input signal system, a request for a registration of the first signal with the signal server; receiving information associated with the request for the registration of the first signal with the signal server; in response to receiving the information associated with the request for the registration of the first signal with the signal server, establishing the registration of the first signal with the signal server; in response to establishing the registration of the first signal with the signal server, associating a movable matching signal with the first signal, wherein the movable matching signal is not associated with a second signal; determining a second substantially real-time computing operation initiated, based at least partially on the first signal, at a second input signal system comprising a second substantially real-time sensor; in response to determining the second substantially real-time computing operation is initiated based at least partially on the first signal, determining whether the movable matching signal is associated with the first signal; in response to determining the movable matching signal is associated with the first signal, executing the second substantially real-time computing operation based at least partially on the movable matching signal and the first signal; determining, during or after execution of the second substantially real-time computing operation, whether an attribute associated with the movable matching signal is extinguished; in response to determining, during or after the execution of the second substantially real-time computing operation, the attribute associated with the movable matching signal is extinguished, disassociating the movable matching signal from the first signal; determining a third substantially real-time computing operation initiated based at least partially on the second signal at a third input signal system comprising a third substantially real-time sensor; in response to determining the third substantially real-time computing operation is initiated based at least partially on the second signal, determining whether the movable matching signal is associated with the second signal; and in response to determining the movable matching signal is not associated with the second signal, executing the third substantially real-time computing operation based at least partially on the second signal, and not based on the movable matching signal, wherein the first signal and the second signal are storable.

In some embodiments, the first signal or the second signal comprises an identification signal. In some embodiments, the first signal or the second signal comprises an identification signal and a computing operation signal. In some embodiments, the identification signal is transmitted from the first input signal system on a first signal path, and wherein the computing operation signal is transmitted from the first input signal system on a second signal path. In some embodiments, determining whether the first signal is registered with the signal server comprises comparing the identification signal to one or more records in an identification database to determine whether the identification signal at least partially matches the one or more records in the identification database. In some embodiments, the first signal is comprised in or associated with a device or a physical object that interacts with the first input signal system or the second input signal system. In some embodiments, the first signal or the second signal is storable in a memory or a database. In some embodiments, the first input signal system, the second input signal system, or the third input signal system comprises or is comprised in a mobile computing system. In some embodiments, the first input signal system, the second input signal system, or the third input signal system comprises a fitness band. In some embodiments, the apparatus comprises or is comprised in at least one of a remote computing apparatus, a local computing apparatus, the first input signal system, the second input signal system, or the third input signal system.

In some embodiments, a method is provided for signal association and disassociation associated with execution of substantially real-time computing operations in a complex computing network, the method comprising: determining, using one or more computing device processors, a first substantially real-time computing operation initiated, based at least partially on a first signal, at a first input signal system comprising a first substantially real-time sensor; in response to determining the first substantially real-time computing operation is initiated based at least partially on the first signal, determining, using the one or more computing device processors, whether the first signal is registered with the signal server; in response to determining the first signal is not registered with the signal server, transmitting, using the one or more computing device processors, to the first input signal system, a request for a registration of the first signal with the signal server; receiving, using the one or more computing device processors, information associated with the request for the registration of the first signal with the signal server; in response to receiving the information associated with the request for the registration of the first signal with the signal server, establishing, using the one or more computing device processors, the registration of the first signal with the signal server; in response to establishing the registration of the first signal with the signal server, associating, using the one or more computing device processors, a movable matching signal with the first signal, wherein the movable matching signal is not associated with a second signal; determining, using the one or more computing device processors, a substantially real-time second computing operation initiated, based at least partially on the first signal, at a second input signal system comprising a second substantially real-time sensor; in response to determining the second substantially real-time computing operation is initiated based at least partially on the first signal, determining, using the one or more computing device processors, whether the movable matching signal is associated with the first signal; in response to determining the movable matching signal is associated with the first signal, executing, using the one or more computing device processors, the second substantially real-time computing operation based at least partially on at least one of the movable matching signal and the first signal; determining, using the one or more computing device processors, during or after execution of the second substantially real-time computing operation, whether an attribute associated with the movable matching signal is extinguished; in response to determining, during or after the execution of the second substantially real-time computing operation, the attribute associated with the movable matching signal is extinguished, disassociating, using the one or more computing device processors, the movable matching signal from the first signal; determining, using the one or more computing device processors, a third substantially real-time computing operation initiated based at least partially on the second signal at a third input signal system comprising a third substantially real-time sensor; in response to determining the third substantially real-time computing operation is initiated based at least partially on the second signal, determining, using the one or more computing device processors, whether the movable matching signal is associated with the second signal; and in response to determining the movable matching signal is not associated with the second signal, executing, using the one or more computing device processors, the third substantially real-time computing operation based at least partially on the second signal, and not based on the movable matching signal, wherein the first signal and the second signal are storable.

In some embodiments, the request for the registration of the first signal with the signal server transmitted to the first signal system is further based on a location of the first input signal system or on an attribute of the first signal. In some embodiments, the first input signal system, the second input signal system, or the third input signal system comprises or is comprised in a mobile computing system or a non-mobile computing system. In some embodiments, the first signal, or an identification signal associated with the first signal, is associated with or comprises a first computing token. In some embodiments, the first signal or the second signal is tokenized, or wherein a computing token is generated or extracted from at least a portion of the first signal or the second signal. In some embodiments, the first signal is tokenized at the first input signal system. In some embodiments, the first signal comprises an identification signal and a computing operation signal, wherein the identification signal is transmitted from the first input signal system on a first signal path to a first server for execution by the first server, and wherein the computing operation signal is transmitted from the first input signal system on a second signal path to a second server for execution by the second server. In some embodiments, the execution of the computing operation signal by the second server occurs after the execution of the first signal by the first server. In some embodiments, the execution of the computing operation signal by the second server is based on the execution of the first signal by the first server. In some embodiments, the one or more computing device processors are comprised in the first server, and wherein the first server is remote to the first input signal system, the second input signal system, and the third input signal system.

BRIEF DESCRIPTION OF THE DRAWINGS

FIG. 8 is an exemplary process flow diagram of an embodiment for registering in a consumer program using a network.

Figure 1:
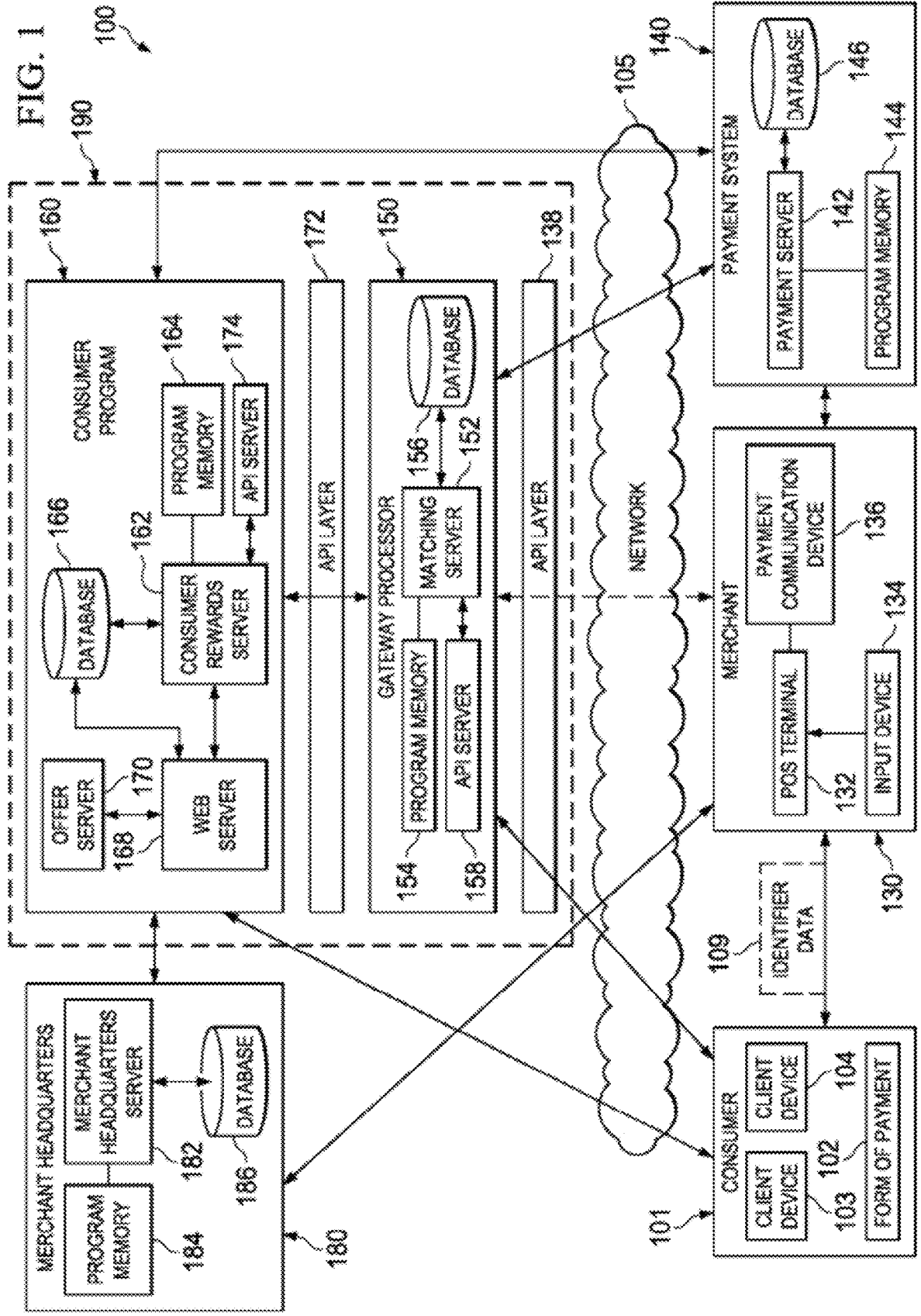
FIG. 1 is a block diagram for a consumer program system that uses a consumer's form of payment to register the consumer in a consumer program, and automatically provides the benefits of the consumer program to the consumer for subsequent purchases made by the consumer.

All of these drawings are illustrations of certain embodiments. The scope of the claims is not limited to the specific embodiments illustrated in the drawings and described below.

DETAILED DESCRIPTION OF THE EMBODIMENTS

FIG. 1 is a block diagram for a consumer program system 100 that uses a consumer's 101 form of payment 102 to register the consumer 101 in a consumer program 160, and automatically provides the benefits of the consumer program 160 to consumer 101 for subsequent purchases made by consumer 101. In some embodiments, consumer 101 may use a form of payment 102, such as a credit card, debit card, electronic fund transfer account, or other payment means with a point of sale ("POS") terminal 132 at a brick-and-mortar merchant 130 to complete a purchase via a payment system 140. In some embodiments, consumer 101 may use a form of payment 102 at an online merchant 130 to complete a purchase via payment system 140. Payment system 140 may determine if the form of payment 102 is associated with consumer program 160, and automatically provide a consumer reward to consumer 101 if form of payment 102 is already registered with consumer program 160. If form of payment 102 is not registered with consumer program 160, merchant 130 may obtain additional data from consumer 101 for consumer 101 to register form of payment 102 and enroll in consumer program 160. System 100 provides an easy way for consumer 101 to register in a consumer program 160, and to receive the benefits of consumer program 160 automatically by using a form of payment 102 at the point of purchase at merchant 130. Thus, consumer program system 100 avoids the hassle, delay and cost of carrying consumer reward cards, gift cards, coupons, and/or remembering unique login/passwords associated with particular merchants 130.

An object of the present disclosure is to provide systems and methods for converting a consumer 101 into a consumer program 160 member of merchant 130 by using the form of payment 102 to register consumer 101 in consumer program 160 and automatically recognize consumer 101 as a member in consumer program 160 based on subsequent purchases made at merchant 130 using form of payment 102, in which consumer rewards are automatically applied during the purchase transactions.

Another object of the present disclosure is to provide systems and methods for registering consumers 101 in consumer program 160 by accessing a network 105 associated with one or more merchants 130. Another object of the present disclosure is to provide systems and methods for presenting consumers 101 with relevant offers or consumer rewards based on the geolocation of consumers 101 and allow consumers 101 to seamlessly register in consumer program 160 during the process of accepting the offers or consumer rewards presented to them by a network 105. Another object of the present disclosure is to provide systems and methods for registering consumers 101 in consumer program 160 using activation codes. A further object of the present disclosure is to provide systems and methods for registering consumers 101 in consumer program 160 using a communication request.

Consumers 101 or patrons 101 of merchants 130 may use any type of client device 103, 104 in use with system 100. For example, client devices 103, 104 may include, but are not limited to, mobile devices; cell phones; laptop computers; desktop computers; end user devices; video monitors; cameras; Personal Digital Assistants ("PDAs"); or any other communication hardware, software, and/or encoded logic that supports the communication of electronic wallets, electronic purchases, web pages, images, videos, text, near field communication electronic signals, or other suitable forms of data. Additionally, in particular embodiments, client devices 103, 104 may include one or more browsers and/or one or more processors operable to execute computer logic and/or software encoded on tangible media that perform the described functionality. Client device 103, 104 may include one or more input devices 134 such as a keyboard, trackball, mouse, and/or one or more Graphical User Interfaces ("GUIs") through which consumer 101 may interact with the applications running on client device 103, 104. Client device 103, 104 may include any appropriate combination of hardware, software, and/or encoded logic suitable to perform the described functionality. Client device 103, 104 may include memory. Client device 103, 104 may be communicatively coupled to elements in system 100 via network 105 and/or any local networks associated with one or more merchants 130. System 100 may comprise any appropriate number and type of client devices 103, 104.

Form of payment 102 may be anything (e.g., hardware, software, magnetic strip, near field communication transmission, etc.) capable of making a purchase of any type. For example, form of payment 102 may be credit cards, debit cards, electronic wallets, electronic payment accounts, consumer 101 billing systems, cell-phone-based electronic payment systems, PDA-based electronic communication systems, or other payment means. Although form of payment 102 is illustrated in FIG. 1 as an element external to client devices 103, 104, form of payment 102 may be internal to client devices 103, 104. For example, a PDA may be capable of transmitting near field communication electronic signals associated with a form of payment 102 (e.g., mobile wallet) located in client devices 103, 104 or any other element in network 105 to a POS terminal 132 or other device at merchant 130 to complete a purchase.

Network 105 may represent any form of communication network supporting circuit-switched, packet-based, and/or any other suitable type of communications. Network 105 may additionally include any other components of system 100 capable of transmitting and/or receiving information over a communication network, including client devices 103, 104, merchant 130, payment system 140, gateway processor 150, consumer program 160 and/or merchant headquarters 180. Although shown in FIG. 1 as a single element, network 105 may represent one or more separate networks (including all or parts of various different networks) that are separated and serve different respective elements illustrated in FIG. 1. Network 105 may include routers, hubs, switches, firewalls, content switches, gateways, call controllers, and/or any other suitable components in any suitable form or arrangement. Network 105 may include, in whole or in part, one or more secured and/or encrypted Virtual Private Networks ("VPNs") operable to couple one or more network elements together by operating or communicating over elements of a public or external communication network. In general, network 105 may comprise any combination of public or private communication equipment such as elements of the public switched telephone network ("PSTN"), a global computer network such as the Internet, a local area network ("LAN"), a wide area network ("WAN"), a radio access network, a near field communication network, or other appropriate communication equipment.

In some embodiments, network 105 may include one or more local area networks associated with one or more merchants 130. The local area networks associated with one or more merchants 130 may be communicatively coupled to the customer program 160 or any other element illustrated in FIG. 1. As explained in more detail below, system 100 and/or local area networks and/or network 105 may be able to determine the geophysical location of consumers 101 or consumers' 101 client devices 103, 104 to target offers based on their location or based on their access to a particular network 105.

To make purchases, consumers 101 may visit merchants 130—traditional (e.g., physical brick and mortar site having a physical address) or online (e.g., virtual location having an electronic address)—connected to the network 105 as shown in FIG. 1. Consumers 101 may use a form of payment 102 to purchase a service or good provided by merchant 130. The online or traditional merchant 130 may communicate with a payment system 140 (e.g., the credit card issuing bank) whenever the consumers' 101 forms of payment 102 are presented to the merchant 130. At a traditional merchant 130, for instance, the forms of payment 102 may be run at a Point-of-Sale ("POS") terminal 132. The POS terminal 132 may be a standalone terminal, a terminal connected to a cash register at the POS, a wireless device (e.g., wireless tablet), etc. The POS terminal 132 may be connected to an input device 134 and a payment communication device 136.

The POS terminal 132 may communicate through a secure connection to a payment system 140 (e.g., a credit card mainframe). This secure connection may be through a security interface unit provided at both ends of the connection between the merchant 130 and payment system 140. The connection between the merchant 130 and the payment system 140 could be through the Internet or through traditional point-to-point communications, such as leased or dial-up telecommunications data lines.

Payment system 140 may include a payment server 142, program memory 144, and a database 146. Payment server 142 processes payments associated with the form of payment 102 used by consumers 101 according to instructions that have been stored in program memory 144. Program memory 144 instructs the operations of payment server 142, and those instructions are stored on computer-readable media. Database 146 stores information related to the form of payment 102 used by consumers 101. Payment system 140 may be any type of hardware and/or software that is capable of processing the payments associated with the form of payment 102 used by consumers 101. For example, payment system 140 may represent a credit card mainframe, credit card interface servers, and/or a debit card or credit card issuing financial institution, etc. Although the functional block represented by payment system 140 is shown as a block at a single site, this broad function may be more specifically implemented using at least two separate sites and/or computer systems. One site as an example may be the acquiring or merchant servicing bank site, which may interface with merchant 130 receiving Authorization Requests ("ARs") and returning Approval Codes ("ACs") through a security interface. The second site in the example may be the credit card issuing bank, which may communicate with the acquiring bank computer system to gather the transaction data and communicate with credit card interface servers in order to determine when to apply appropriate discounts to the consumers' credit card statement. Both the first and the second site may be functionally encompassed within payment system 140.

For example, approval and clearing operation for a form of payment 102 with payment system 140 may occur as follows. The consumer 101 may give his card to the merchant 130 employee, who may swipe the card through a credit card reader associated with the POS terminal 132 as is normally done in a credit card transaction. Merchant 130 may then communicate with the payment system 140 in order to seek an authorization code for the transaction from the payment system 140. The payment system 140 may then communicate with gateway processor 150, and/or consumer program 160 to determine whether the consumer 101 and/or form of payment 102 are registered or associated with a consumer program 160 regarding the purchase made at merchant 130. Consumer 101 is entitled to a discount according to that consumer's 101 purchases at the merchant 130. Payment system 140 may also gather the necessary data offline, e.g., separate from the regular credit card authorization process. The interface for this clearing process may alternatively be an entirely parallel network between the merchant 130 and the payment system 140.

Figure 5:
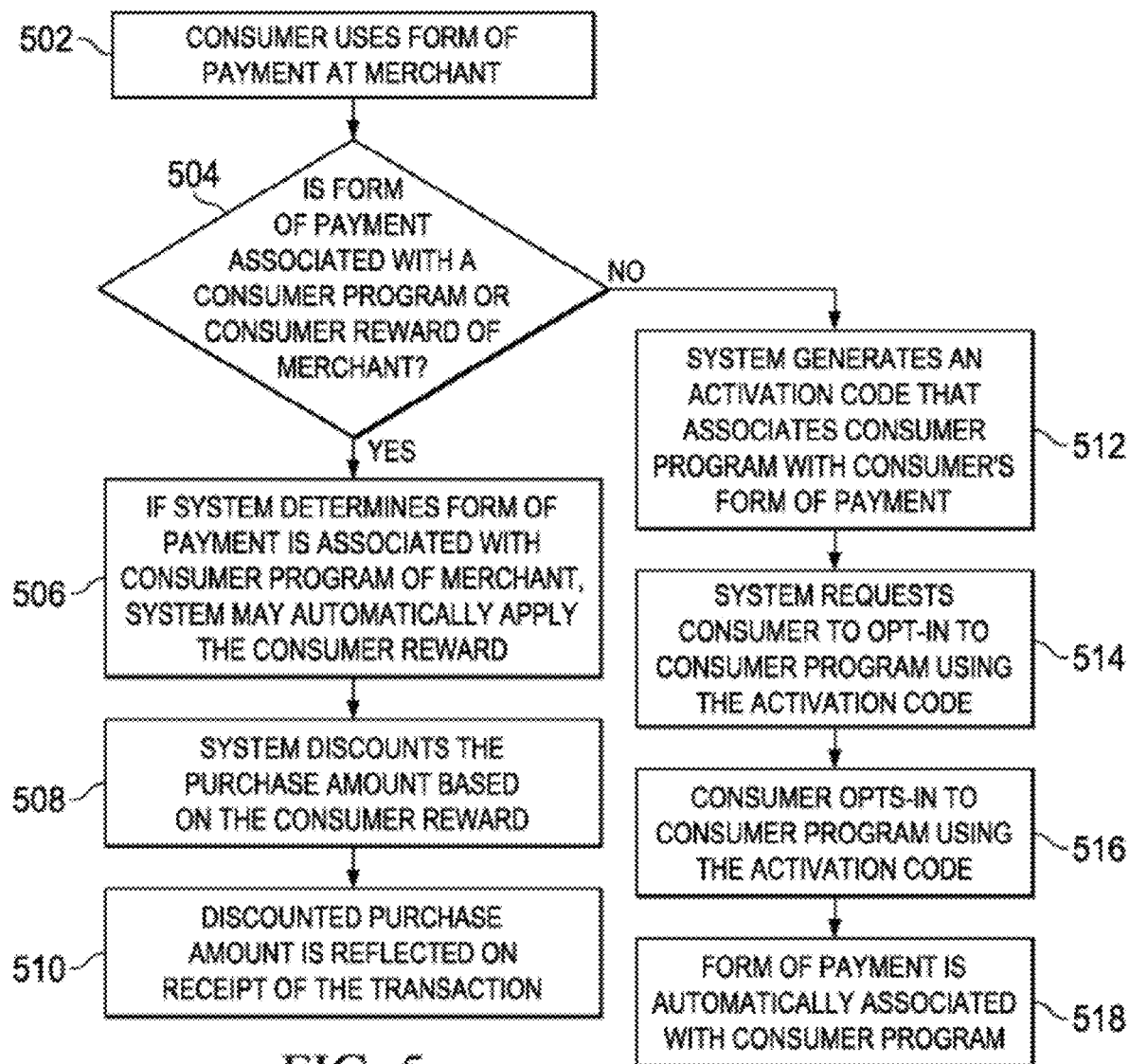
FIG. 5 is an exemplary process flow diagram of an embodiment for registering in a consumer program using an activation code.

Gateway processor 150 may include matching server 152, program memory 154, database 156. In an embodiment where there is an API layer 138 between merchant 130 and gateway processor 150, gateway processor 150 further comprises an API server 158. Matching server 152 may be used for determining whether a consumer's 101 form of payment 102 is associated with a consumer program 160. Matching server 152 may also be used for storing information in database 156. Database 156 may include an entry linking a consumer's 101 name, one or more addresses for consumer 101, one or more forms of payment 102, one or more electronic addresses of client devices 103, 104, one or more phone numbers, one or more passwords associated with consumer program 160, one or more consumer programs 160, one or more consumer rewards, one or more expiration dates associated with the one or more consumer rewards, etc. Matching server 152 may use database 156 to keep track of a consumer's 101 profile, including what offers consumer 101 has accepted, what offers the consumer 101 has declined, and other information related to the consumer 101. The matching server 152 may also generate activation codes, as illustrated in FIG. 5. The matching server 152 may have program memory 154, which implements the functionality to be performed by the matching server 152. Matching server 152 operates according to instructions that have been stored in program memory 154. Program memory 154 instructs the operations of matching server 152, and those instructions are stored on computer-readable media.

Matching server 152 may be used to link consumers 101, consumer rewards, and/or consumer programs 160 with one or more forms of payment 102 of consumer 101 in database 156. System 100 may utilize matching server 152 and/or database 156 to determine if payment transactions cleared through payment system 140 are associated with a form of payment 102 stored in matching server 152 and/or database 156. In an embodiment, when a consumer 101 presents a form of payment 102 at a merchant 130, the POS terminal 132 or payment communication device 136 may communicate with matching server 152 to determine if consumer 101 is registered in consumer program 160 based on the form of payment 102 presented. Through these linkages, proper credit or consumer rewards can be applied in those instances in which consumers 101 make a purchase associated with a consumer program 160 stored in their database 156. For example, every time consumer 101 uses a form of payment 102 at a merchant 130, payment system 140 may communicate with matching server 152 or database 156 to determine if a consumer reward or consumer program 160 is associated with the form of payment 102 and/or the merchant 130 and/or the goods or services purchased. An advantage of system 100 is that consumer 101 does not need to remember to carry a special card or remember a special identifier associated with a particular consumer program 160 because system 100 allows for consumers 101 to use forms of payment 102, as normal, and gain the benefits of being enrolled in a consumer program 160 without the hassles of needing to carry a special card or identifier.

Consumer program 160 may be anything that incentives consumers 101 to make purchases at merchant 130 associated with consumer program 160. In an embodiment, consumer program 160 and gateway processor 150 are a consumer program system 190. Consumer program 160 may be any type of hardware (e.g., web server) and/or software (e.g., web site) that uses any type of consumer rewards to provide an incentive for consumer 101 to make a purchase at merchant 130. For example, consumer program 160 may provide electronic punches to consumer 101 upon the completion of certain events (e.g., registering form of payment 102 with consumer program 160, every $10 purchased, referring another consumer 101 to register in consumer program 160, buying a virtual electronic gift for another consumer 101, etc.), in which the electronic punches may be automatically redeemed for consumer rewards.

Consumer program 160 may include a consumer rewards server 162, program memory 164, database 166, web server 168, offer server 170, and API server 174. API server 174 interfaces with gateway processor 150 via API layer 172. Consumer rewards server 162 may be used for storing information in database 166, including information related to a consumer 101, client device 103, 104, form of payment 102, and/or consumer program 160. Consumer rewards server 162 may use database 166 to keep track of a consumer's 101 profile, including what offers consumer 101 has accepted, what offers the consumer 101 has declined, and other information related to the consumer 101. Consumer rewards server 162 may comprise program memory 164, which implements the functionality to be performed by the consumer rewards server 162 at consumer program 160. Consumer rewards server 162 operates according to instructions that have been stored in program memory 164. Program memory 164 instructs the operations of consumer rewards server 162, and those instructions are stored on computer-readable media.

Offer server 170 may be used for storing consumer rewards offers received from merchant headquarters server 182. Offer server 170 may also be used for transmitting consumer rewards offers to web server 168. Offer server 170 may comprise program memory, which implements the functionality to be performed by the offer server 170 at consumer program 160. Offer server 170 operates according to instructions that have been stored in program memory. Program memory instructs the operations of offer server 170, and those instructions are stored on computer-readable media. Web server 168 may present consumer rewards offers to consumers' 101 client devices 103, 104 via websites. Web server 168 may comprise program memory, which implements the functionality to be performed by the web server 168. Web server 168 operates according to instructions that have been stored in program memory. Program memory instructs the operations of web server 168, and those instructions are stored on computer-readable media.

Merchant headquarters 180 may include a merchant headquarters server 182, program memory 184, and a database 186. Merchant headquarters server 182 may comprise program memory 184, which implements the functionality to be performed by the merchant headquarters server 182 at merchant headquarters 180. Merchant headquarters server 182 operates according to instructions that have been stored in program memory 184. Program memory 184 instructs the operations of merchant headquarters server 182, and those instructions are stored on computer-readable media. Consumer rewards offers are defined by merchant headquarters server 182 at merchant headquarters 180 and are stored in database 186. Consumer rewards may be any type of paperless credit (e.g., an electronic virtual gift for $10) or coupon or discount (e.g., $2 off a purchase of $10 or more) associated with consumer program 160 that may be gained as a result of completing purchases at merchants 130 associated with consumer program 160. Consumer rewards offers may be transmitted from merchant headquarters server 182 to offer server 170 at connection 188. Merchant headquarters server 182 may also receive information from offer server 170 tracking redemptions of consumer rewards at connection 190, and redemption information may be stored in database 186.

The consumer rewards associated with the consumer program 160 for a particular merchant 130 can be applied in a number of ways. One way is to transmit the consumer reward or discount back to the POS terminal 132 through the security interfaces as a part of the normal credit card approval process. A second way may be to apply the consumer reward or discount to the monthly statement of the consumer 101 in the payment system 140. And a third way may be for the consumer rewards or discounts to be accumulated and reimbursed to the consumer 101 through the issuance of monetary payment or other items of value from either the payment system 140, merchant 130, or consumer program 160.

The direct association of consumer programs 160 and consumer rewards with the consumers' 101 payment systems 140 and forms of payment 102 in databases 156, 166 can make the targeted offers more flexible. In a specific example, a particular offer of a consumer program 160 and/or consumer reward can be made to a consumer 101 for a merchant 130 that is close to the consumer 101 based on the consumer's 101 location. Such offers could, for example, be advantageously delivered to consumers' 101 client devices 103, 104, such as cell phones or wireless PDAs, based on the consumers' 101 detected locations. Rather than delivering an offer to be displayed on such client devices 103, 104 for display to a merchant 130 as a means of redemption, the present embodiments allow consumers 101 to electronically enroll in and accept the consumer reward and have those offers automatically be associated with the consumers' 101 credit cards or other payment systems 140. As with paper coupons, this electronic acceptance and association with the consumers' 101 payment system 140 also mitigates against possible fraudulent attempts to redeem invalid offers, such as by displaying a contrived or unauthorized offer screen to the merchants 130. The described embodiments further may negate the need for the merchant 130 to install additional equipment.

Because consumer 101 has been freed from the necessity of printing out or carrying paper coupons or consumer rewards cards, the consumer 101 can register in a consumer program 160 and automatically associate the consumer program 160 and consumer rewards with the consumer's 101 form of payment 102. Also, because of the immediacy of linking consumer program 160 and consumer rewards with the consumer's 101 form of payment 102 or on payment system 140, as well as the trackability of client devices 103, 104 it is readily possible to make the consumer reward time-adaptable. For example, the consumer 101 might be in the vicinity of Merchant XYZ 130, and the consumer 101 accordingly might be given a consumer reward for 25% off of purchases at that merchant 130 made within 3 hours (or, as another example, the same day). The consumer reward might decrease 5% in value during the next time period (e.g., between 3 hours and 12 hours or during the next day), and decrease another 5% in the next period, and so on.

An object of the present disclosure is to provide a method for converting a consumer 101 into a consumer program 160 member of merchant 130 by using the form of payment 102 to register consumer 101 in consumer program 160 and automatically recognize consumer 101 as a member in consumer program 160 based on subsequent purchases made at merchant 130 using form of payment 102, in which consumer rewards are automatically applied during the purchase transactions.

Because one or more forms of payment 102 of consumer 101 is already stored on system 100, these forms of payment 102 (or account number for other type of payment vehicle) can be added to the consumer program 160 for merchant 130, and then be used to track every time the consumer 101, and now consumer program 160 member, shops at merchant 130 with one of the registered forms of payment 102 associated with the consumer program 160. As such, points can be earned automatically for consumer program 160 and consumer rewards on behalf of consumer 101. Such an approach differs from a conventional consumer rewards system because it provides a means to conveniently migrate a consumer 101 at a merchant 130 into a consumer reward/consumer program 160 member of a particular merchant 130. Thus, system 100 may provide incentives for consumers 101 to continually make purchases at merchant 130.

In some embodiments, system 100 can automatically determine additional forms of payment 102 associated with consumer 101, upon the purchase or registration associated with one form of payment 102 used in system 100. Thus, system 100 allows consumer 101 to use multiple forms of payment 102 (even if it was not the form of payment 102 used to register in consumer program 160) that can automatically be recognized by system 100 to link the form of payment 102 with consumer program 160 and/or consumer reward during the purchase.

Each of form of payment 102, client devices 103, 104, merchant 130, POS terminal 132, payment communication device 136, payment system 140, gateway 142, payment server 144, reward processing system 150, matching server 152, consumer program 160, consumer rewards server 162, web server 168, offer server 170, merchant headquarters 180, merchant headquarters server 182, databases 146, 156, 166, 186, and/or program memory 154, 164, 184 may represent any appropriate combination of hardware (e.g., servers, processors and/or memory), logic, and/or software suitable to perform the described functions. Some embodiments of the disclosure may include logic and/or software contained within a medium. The medium may include RAM, ROM, or disk drives. The medium may be non-transitory. In some embodiments, the logic and/or software may be contained within hardware configuration. The logic and/or software may also be embedded within any other suitable medium without departing from the scope of the disclosure. Processor may represent and/or include any form of processing component, including general purpose computers, dedicated microprocessors, or other processing devices capable of processing electronic information. Examples of processor include digital signal processors ("DSPs"), application-specific integrated circuits ("ASICs"), field-programmable gate arrays ("FPGAs"), and any other suitable specific or general purpose processors. Memory may store processor instructions, information resources, and/or any other suitable information. Memory may comprise any collection and arrangement of volatile and/or non-volatile components suitable for storing data. For example, memory may comprise random access memory ("RAM") devices, read only memory ("ROM") devices, magnetic storage devices, optical storage devices, and/or any other suitable data storage devices. In particular embodiments, memory may represent, in part, computer-readable storage media on which computer instructions and/or logic are encoded.

Although not illustrated as part of the same entity or location, in some embodiments one or more functional blocks illustrated in FIG. 1 may be part of the same entity or location. For example, reward processing system 150 may be associated with the same entity or location as merchant 130, payment system 140, consumer program 160, or merchant headquarters 180.

As discussed in FIG. 8 below, in some embodiments, registration in consumer program 160 may occur when a consumer 101 accesses a network 105 that may be associated with one or more merchants 130. After seamlessly registering in a consumer program 160 while accessing the network 105, consumers 101 may receive targeted offers for particular merchants 130 based on their access of a particular network 105 or based on their geophysical location. Thus, the present disclosure allows for consumers 101 to seamlessly register for and accept targeted offers for merchants 130 in their areas to immediately take advantage of an offer for a purchase at a nearby merchant 130.

As discussed in FIG. 3 below, in some embodiments, registration in consumer program 160 may occur at the point of sale at a POS terminal 132 or online transaction by automatically linking and registering consumer's 101 form of payment 102 with consumer program 160. For example, upon presentment of form of payment 102, merchant 130 and/or POS terminal 132 may automatically determine if the form of payment 102 used to make the purchase is associated with the merchant's 130 consumer program 160. If the form of payment 102 is not associated with a consumer program 160, merchant 130 may ask consumer 101 if consumer 102 would like to opt-in and register in consumer program 160.

The mechanism in which merchant 130 can request whether consumer 101 opts-in and registers for consumer program 160 can occur in any manner. For example, upon recognizing that form of payment 102 is not associated with merchant's 130 consumer program 160, merchant 130 (or any other element in FIG. 1, such as consumer program 160) may initiate a communication (e.g., e-mail, text message, web-page, post to consumer's 101 social web site, near-field communication, employee of merchant 130 asking consumer 101, etc.) to client device 103, 104 asking if consumer 101 desires to opt-in and register for consumer program 160. Consumer 101 may be requested to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160. In some embodiments, the opt-in process may utilize the POS terminal 132 used in connection with the form of payment 102 to make the purchase, as described in more detail in FIG. 2. For example, consumer 101 may provide identifier data 109 via POS terminal 132 during the point of purchase. In some embodiments, the POS terminal 132 may not require a software or hardware modification to achieve the teachings of this disclosure. In some embodiments, a merchant 130 may request identifier data 109 (e.g., mobile phone number) from consumer 101 so that merchant 130 has identifier data 109 to send an opt-in message to consumer 101 for registering form of payment 102 with consumer program 160.

The opt-in message may provide instructions for consumer 101 and/or client device 103, 104 to register in consumer program 160. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message to client device 103, 104 asking if consumer 101 would like to enroll in consumer program 160, or asking consumer 101 for other identifier data 109. Consumer 101 can opt-in and register in consumer program 160 via client device 103, 104 seamlessly and easily.

In some embodiments, a communication request may require the consumer 101 to reply with another communication with "Y" or "Yes" to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

In some embodiments, an activation code linked to consumer's 101 form of payment 102 may be used to complete registration in consumer program 160 via a web site or other means, as described in FIG. 5. In some embodiments, the activation code may be provided to consumer 101 on a receipt printed by POS terminal 132 at the point of sale, as described in FIG. 6. In some embodiments, system 100 may send an activation code to the consumer 101 via text message or other form of communication, as described in FIG. 7.

After consumer 101 and/or form of payment 102 have been registered with consumer program 160, system 100 can recognize that form of payment 102 used to complete a purchase is registered with consumer program 160. For example, POS terminal 132 or web server can communicate with payment system 140, consumer program 160, and/or matching server 152 to determine if the form of payment 102 is registered with a consumer program 160 associated with the purchase. Further, system 100 can automatically apply consumer rewards (e.g., discount, gift, coupon, etc.) to the purchase during the point of sale, in which the receipt identifies the purchase price in addition to the consumer reward applied to the purchase. In some embodiments, the consumer reward may be automatically applied. In some embodiments, the consumer 101 may be asked if they desire to apply a consumer reward for the purchase being made. For example, if consumer 101 has a consumer reward offering $3 off the next purchase at merchant 130, then system 100 may automatically deduct $3 off the total purchase price by automatically determining form of payment 102 is associated with a consumer program 160 with a consumer reward that should be applied to the current transaction. For example, upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or MasterCard®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of consumer rewards for qualifying purchases in which the form of payment 102 is registered with a consumer program 160 associated with merchant 130, although there are be a number of possible methods by which this redemption can be accomplished.

System 100 may send notification to consumer 101 that a consumer reward has been redeemed or applied to purchase goods or services at merchant 130. System 100 applies discount or credit of consumer reward to the purchase made by consumer 101. For example, if consumer reward was for 20% off purchases made at merchant 130, then this discount may be automatically applied at the POS terminal 132 or at checkout at an online merchant 130. In another example, if the consumer reward was for a $15 credit to use at merchant 130, then this credit may be automatically applied to the final total of the purchase made at the POS terminal 132 or at checkout at an online merchant 130.

In some embodiments, consumer 101 may register form of payment 102 with consumer program 160 prior to purchase of goods or services at the point of sale. For example, consumer 101 may register form of payment 102 with consumer program 160 via a web site. In another example, consumer 101 may be presented with a consumer reward (e.g., virtual coupon, virtual gift or credit, etc.) via a web site, a social network site, a text message, an e-mail, a banner advertisement, etc. that consumer 101 may accept, which may begin the process of consumer 101 registering form of payment 102 to be linked with the consumer program 160 associated with the consumer reward. Thus, when consumer 101 purchases goods or services at merchant 130 associated with the consumer reward, the system automatically determines that the form of payment 102 is linked to the consumer reward, and automatically redeems the consumer reward at the point of sale.

Figure 2:
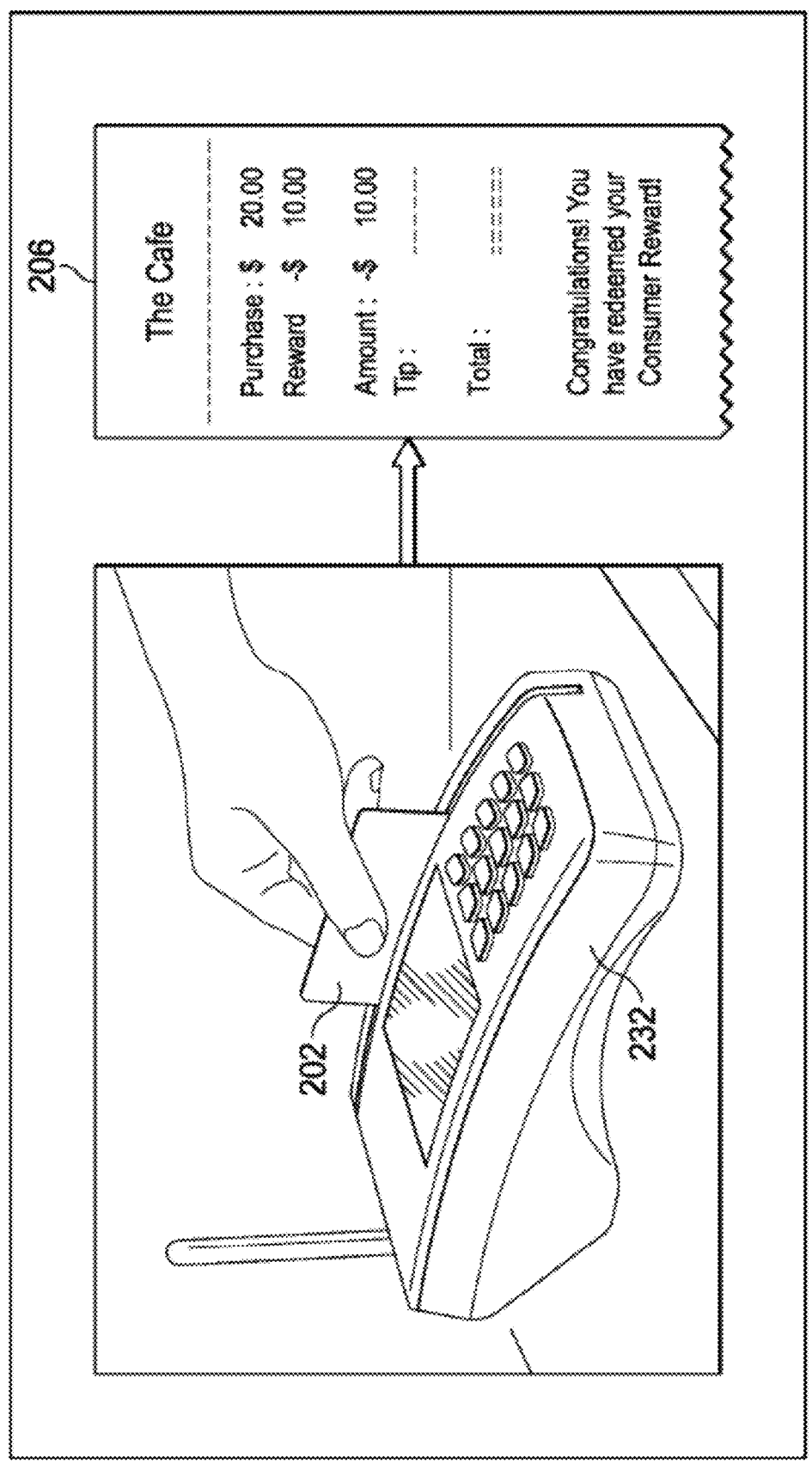
FIG. 2 is a block diagram of a consumer's form of payment that may automatically receive the benefits of a consumer program upon making a purchase at a point of sale device.

Illustrated in FIG. 2 is a block diagram of the system 100 of FIG. 1. This figure illustrates the interaction between some of the system elements described in FIG. 1. While there are certain elements shown in FIG. 1 that are not illustrated in FIG. 2 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100, the consumer 101 may use a form of payment 202 to register in the consumer program 160, and automatically and transparently redeem consumer rewards. In some embodiments, consumer's 101 form of payment 202 may be processed by a POS terminal 232 at a merchant 130 to purchase goods or services associated with consumer program 160 and consumer reward. Upon purchase, POS terminal 232 may automatically redeem consumer rewards to the purchase as illustrated in the exemplary receipt 206 of the purchase made at the merchant 130 known as The Cafe.

In some embodiments, employee of merchant 130 may ask consumer 101 if consumer 101 is a member of merchant's 130 consumer program 160. If not, consumer 101 may begin registering form of payment 202 with consumer program 160. In some embodiments, registration of a consumer 101 may require the form of payment 202 and, in some embodiments, a unique identifier 109 (e.g., mobile phone number) or other data may also be required, such as a first name, last name, zip code, and agreement that the consumer 101 is over the age of 13 and agrees to the terms and conditions of the consumer program 160. In some embodiments, registration of consumer 101 in consumer program 160 can be completed at the point of sale. For example, employee of merchant 130 may ask consumer 101 if consumer 101 would like to join, and if the consumer 101 agrees, the waiter can ask consumer 101 for unique identifier 109 along with the form of payment 202 (e.g., credit card).

In embodiments in which a brick-and-mortar merchant 130 uses a POS terminal 204 to complete the purchase, employee of merchant 130 may click a button to begin the communication flow for registering a consumer 101 in consumer program 160. Employee of merchant 130 may use the buttons of POS terminal 204 to input the unique identifier 109 (e.g., mobile phone number). Next, employee may swipe form of payment 202 with POS terminal 204 (or use near field communications to transmit mobile wallet data 202 to POS terminal 204), when prompted by POS terminal 204. POS terminal 204 or any other device may tokenize data associated with form of payment 202, along with the unique identifier 109 and other data provided by consumer 101, and transmit it to payment system 140, consumer program 160, and/or payment matching system 160. In some embodiments, certain identifying information of consumer 101 may be obtained from form of payment 202. For example, form of payment 202 may be a credit card with a magnetic stripe or a mobile wallet that may include additional information about consumer 101.

Figure 3:
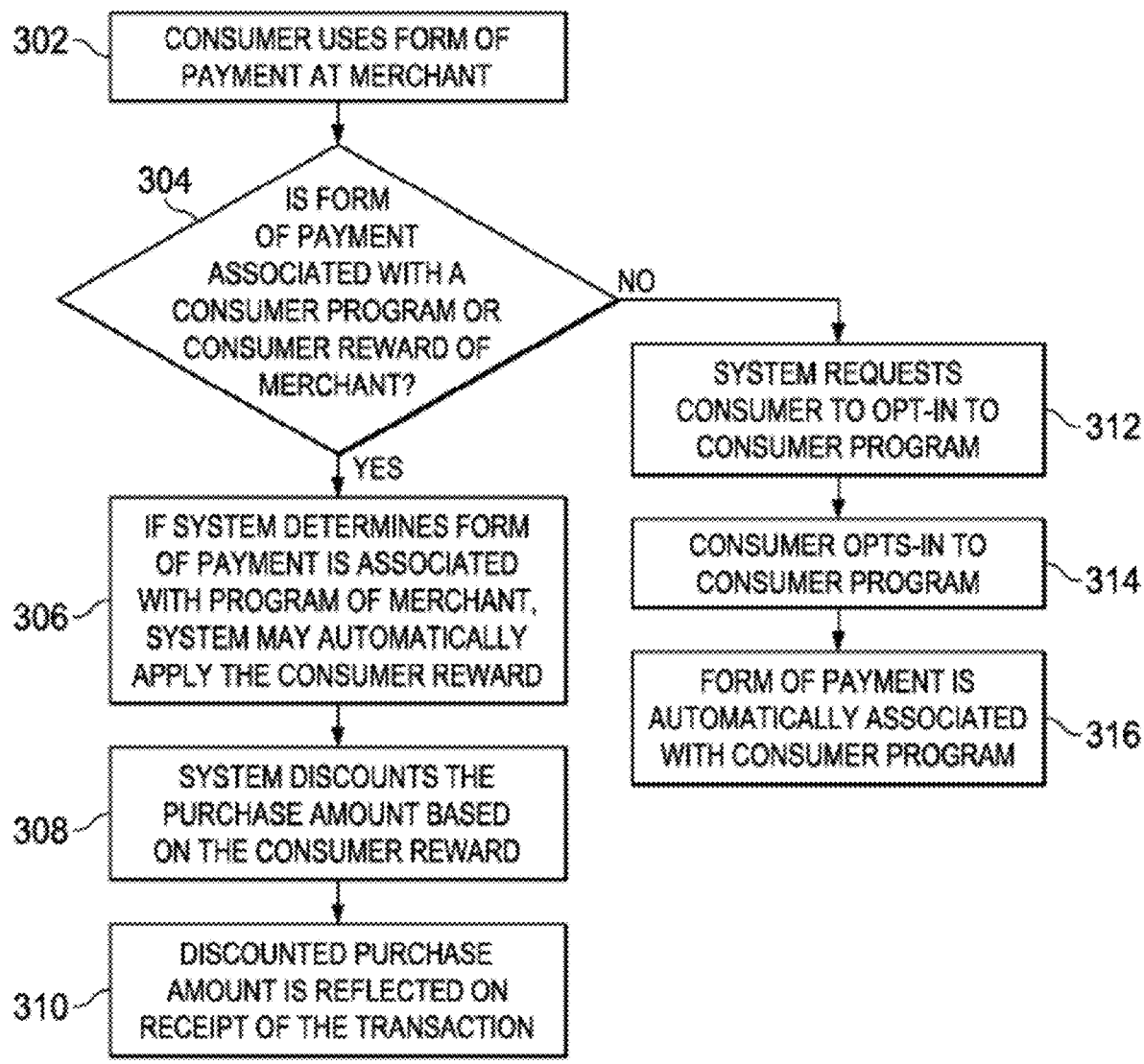
FIG. 3 is an exemplary process flow diagram for registering in a consumer program using a payment system.

Illustrated in FIG. 3 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 3 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, a payment system 140 may be used to register consumers 101 in a consumer program 160. At step 302, consumer 101 uses form of payment 102 to make a purchase at merchant 130. At step 304, merchant 130 determines if form of payment 102 is registered or not. If form of payment 102 is not registered, merchant 130 registers form of payment 102 with consumer program 160. In some embodiments, registration in consumer program 160 may occur at the point of sale at a POS terminal 132 or online transaction by automatically linking and registering consumer's 101 form of payment 102 with consumer program 160. For example, upon presentment of form of payment 102, merchant 130 and/or POS terminal 132 may automatically determine if the form of payment 102 used to make the purchase is associated with the merchant's 130 consumer program 160.

At step 312, system may request for consumer 101 to opt-in to consumer program 160. The mechanism in which merchant 130 can request whether consumer 101 opts-in and registers for consumer program 160 can occur in any manner. For example, upon recognizing that form of payment 102 is not associated with merchant's 130 consumer program 160, merchant 130 (or any other element in FIG. 1, such as consumer program 160) may initiate a communication (e.g., e-mail, text message, web-page, post to consumer's 101 social web site, near field communication, employee of merchant 130 asking consumer 101, etc.) to client device 103, 104 asking if consumer 101 desires to opt-in and register for consumer program 160. Consumer 101 may be requested to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160. In some embodiments, the opt-in process may utilize the POS terminal 132 used in connection with the form of payment 102 to make the purchase, as described above in more detail in FIG. 2. For example, consumer 101 may provide identifier data 109 via POS terminal 132 during the point of purchase. In some embodiments, the POS terminal 132 may not require a software or hardware modification to achieve the teachings of this disclosure. In some embodiments, a merchant 130 may request identifier data 109 (e.g., mobile phone number) from consumer 101 so that merchant 130 has identifier data 109 to send an opt-in message to consumer 101 for registering form of payment 102 with consumer program 160. The opt-in message may provide instructions for consumer 101 and/or client device 103, 104 to register in consumer program 160.

At step 314, the consumer 101 may opt-in to the consumer program 160. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message to client device 103, 104 asking if consumer 101 would like to enroll in consumer program 160, or asking consumer 101 for other identifier data 109. Consumer 101 can opt-in and register in consumer program 160 via client device 103, 104 seamlessly and easily.

Figure 4:
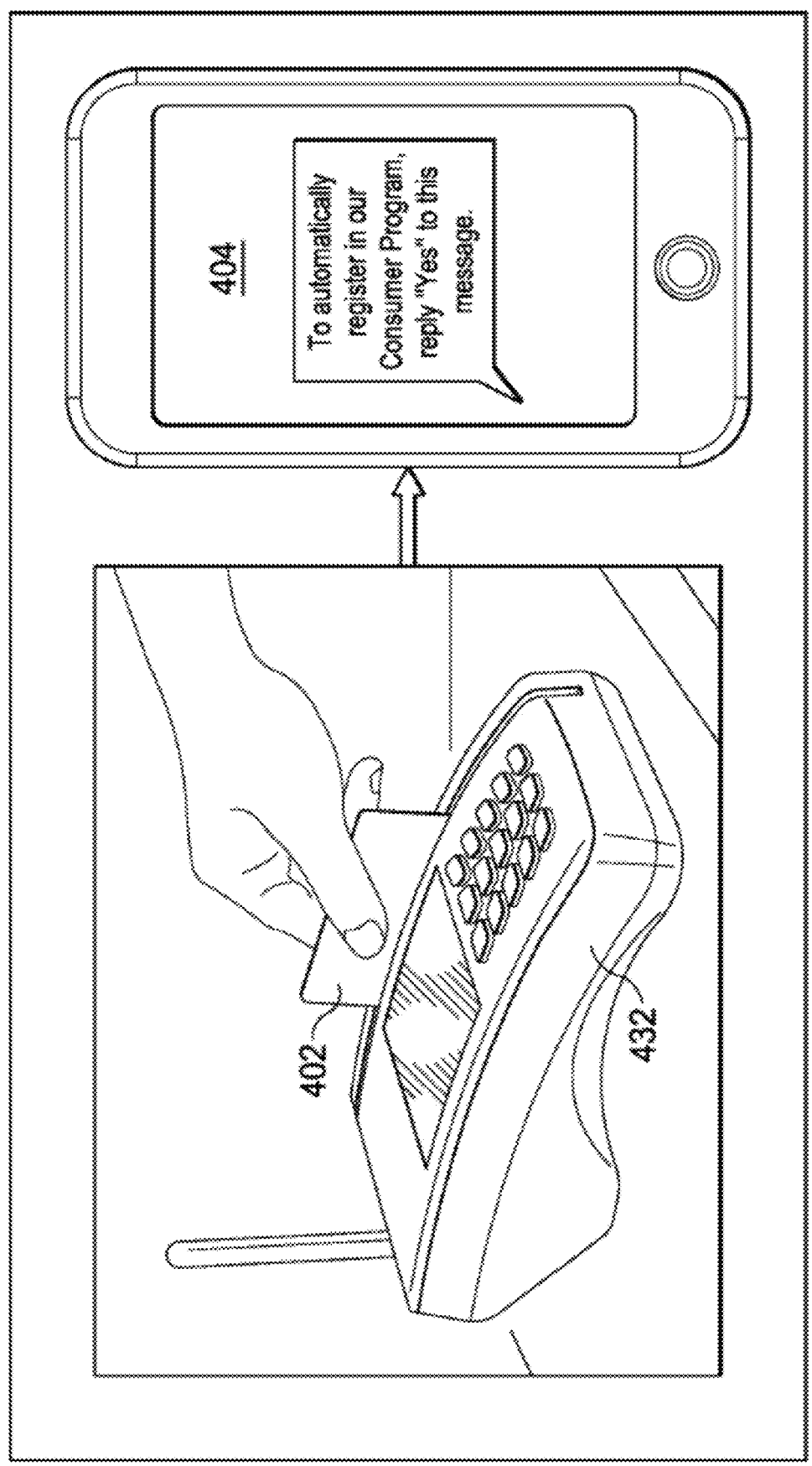
FIG. 4 is an exemplary block diagram of an embodiment for registering in a consumer program at the point of sale.

In some embodiments, a communication request may require the consumer 101 to reply with another communication with "Y" or "Yes" to confirm enrollment in the consumer program 160, as further described in FIG. 4. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

At step 316, if merchant determines that form of payment 102 is associated with a consumer program 160, merchant 130 can automatically track the consumer's 101 transaction and automatically redeem consumer rewards for purchases at the point of sale. System 100 can recognize that form of payment 102 used to complete a purchase is registered with consumer program 160. For example, POS terminal 132 or web server can communicate with payment system 140, consumer program 160, and/or matching server 152 to determine if the form of payment 102 is registered with a consumer program 160 associated with the purchase.

At step 308, system 100 can automatically apply consumer rewards (e.g., discount, gift, coupon, etc.) to the purchase during the point of sale, in which the receipt identifies the purchase price in addition to the consumer reward applied to the purchase at step 310. In some embodiments, the consumer reward may be automatically applied.

In some embodiments, the consumer 101 may be asked if they desire to apply a consumer reward for the purchase being made. For example, if consumer 101 has a consumer reward offering $3 off the next purchase at merchant 130, then system 100 may automatically deduct $3 off the total purchase price by automatically determining form of payment 102 is associated with a consumer program 160 with a consumer reward that should be applied to the current transaction. For example, upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or MasterCard®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of consumer rewards for qualifying purchases in which the form of payment 102 is registered with a consumer program 160 associated with merchant 130, although there are be a number of possible methods by which this redemption can be accomplished.

System 100 may send notification to consumer 101 that a consumer reward has been redeemed or applied to purchase goods or services at merchant 130. System 100 applies discount or credit of consumer reward to the purchase made by consumer 101. For example, if consumer reward was for 20% off purchases made at merchant 130, then this discount may be automatically applied at the POS terminal 132 or at checkout at an online merchant 130. In another example, if the consumer reward was for a $15 credit to use at merchant 130, then this credit may be automatically applied to the final total of the purchase made at the POS terminal 132 or at checkout at an online merchant 130.

Illustrated in FIG. 4 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 4 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, at the point of sale, employee of merchant 130 may ask consumer 101 if consumer 101 would like to join a consumer program 160, and if the consumer 101 agrees, the merchant 130 can ask consumer 101 for a unique identifier 109 (e.g., mobile phone number) or other data, such as a first name, last name, zip code, and agreement that the consumer 101 is over the age of 13 and agrees to the terms and conditions of the consumer program 160.

In embodiments in which a brick-and-mortar merchant 130 uses a POS terminal 432 to complete the purchase, employee of merchant 130 may click a button to begin the communication flow for registering a consumer 101 in consumer program 160. Employee of merchant 130 may use the buttons of POS terminal 432 to input the unique identifier 109 (e.g., mobile phone number). Next, employee may swipe form of payment 402 with POS terminal 432 (or use near field communications to transmit mobile wallet data 202 to POS terminal 432), when prompted by POS terminal 432. POS terminal 432 or any other device may tokenize data associated with form of payment 402, along with the unique identifier 109 and other data provided by consumer 101, and transmit it to payment system 140, consumer program 160, and/or payment matching system 160. In some embodiments, certain identifying information of consumer 101 may be obtained from form of payment 402. For example, form of payment 402 may be a credit card with a magnetic stripe or a mobile wallet that may include additional information about consumer 101.

System 100 may send a communication request to consumer 101 asking for consumer 101 to opt-in to the consumer program 160 at the point of sale. If a consumer 101 opts-out, data associated with consumer 101 and consumer's 101 associated form of payment 402 may be deleted from the database 156 or any other device in system 100. In the illustrated embodiment, a communication request may require the consumer 101 to reply with another communication with "Y" or "Yes" to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information. In some embodiments, consumer 101 may need to agree to certain terms and conditions of consumer program 160.

Illustrated in FIG. 5 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 5 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, an activation code may be used to register consumers 101 in a consumer program 160. At step 502, consumer 101 uses a form of payment 102 at merchant 130. At step 504, system 100 may determine if form of payment 102 is registered with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with a consumer program 160 or consumer reward associated with merchant 130. If form of payment 102 is registered, the flow continues at step 508. If form of payment 102 is not registered, the flow continues at step 512.

At step 512, system 100 may generate an activation code. An activation code is anything that may be used to associate the form of payment 102 of a consumer 101 who has not yet enrolled in consumer program 160 with the consumer program 160 or consumer reward of merchant 130. The activation code may be generated by matching server 152 in rewards processing system 150. The activation code may be generated in real-time based on tokenized data received from payment system 140, which allows for the secure transmittal of the consumer's 101 form of payment 102 information. By associating the form of payment 102 used by a consumer 101 who has not yet enrolled in consumer program 160 with the consumer program 160 or consumer reward, this allows consumer 101 to use the activation code generated in real-time to easily enroll in the consumer program 160 using a client device 103, 104 at the point of sale or gradually enroll at a later time.

At step 514, the system 100 may request consumer 101 to register in consumer program 160 using the activation code. The process for registering a consumer 101 may have one or many steps to complete the registration. In some embodiments, consumer 101 and/or form of payment 102 may be automatically registered into consumer program 160 during the initial purchase made using the form of payment 102 at merchant 130. For example, a client device 103, 104 (e.g., mobile phone) may use near field communications to transmit its form of payment 102 (e.g., mobile wallet or mobile bank account) information to a POS terminal 132 at merchant 130 to complete the purchase. Transparent to the consumer 101, POS terminal 132 may automatically determine the address of client device 103, 104 and send an opt-in request message with the activation code to client device 103, 104 asking if consumer 101 would like to enroll in consumer program 160, or asking consumer 101 for other identifier data 109. Consumer 101 can opt-in and register in consumer program 160 via client device 103, 104 using the activation code seamlessly and easily.

Figure 6:
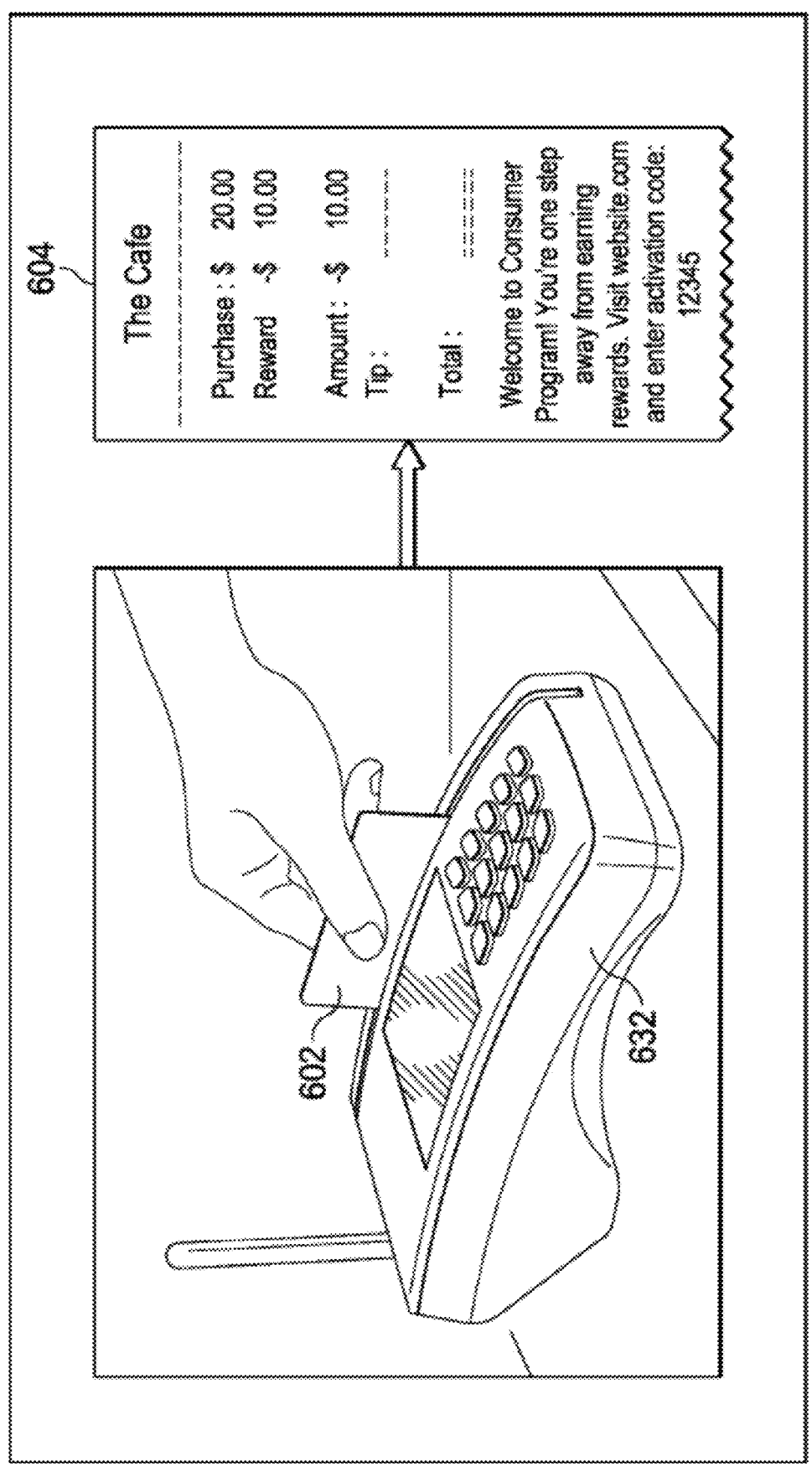
FIG. 6 is an exemplary block diagram of an embodiment for registering in a consumer program using an activation code on a receipt.

In one embodiment, the activation code may be printed on a receipt presented to consumer 101 at the POS terminal 132, as further shown in FIG. 6. The receipt may include instructions for a consumer 101 to register in a consumer program 160 using the activation code. For example, the receipt may include instructions for the consumer 101 to enter the activation code on a web site associated with the consumer program 160. The receipt may also include instructions for the consumer 101 to enter additional identifier data 109 on the web site associated with the consumer program 160 in order to complete registration.

Figure 7:
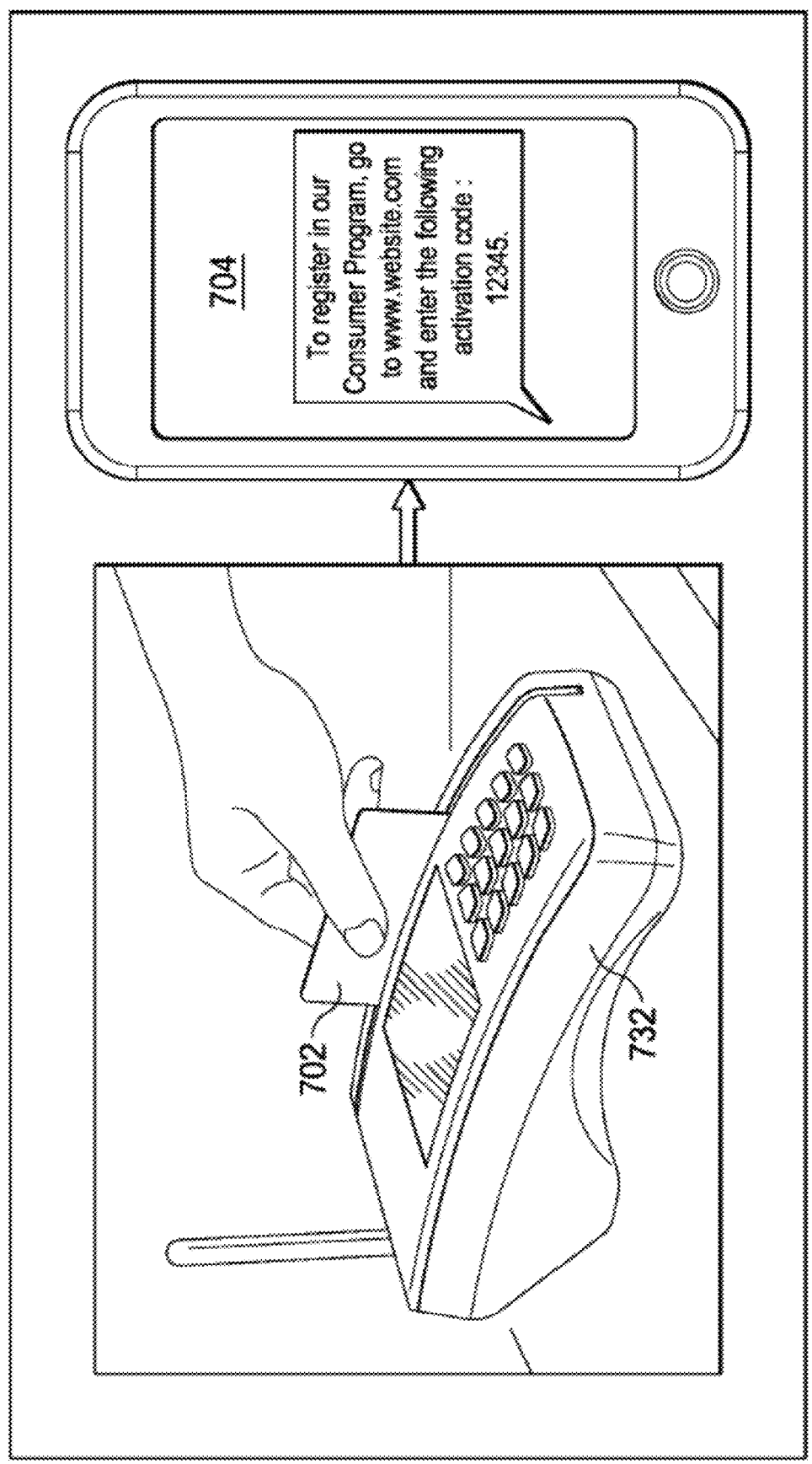
FIG. 7 is an exemplary block diagram of an embodiment for registering in a consumer program using an activation code sent via text message.

In another embodiment, the activation code associated with consumer's 101 form of payment 102 may be sent to a consumer 101 or a consumer's 101 client device 103, 104 using a communication request, as further shown in FIG. 7. In the illustrated embodiment, a merchant 130 may request identifier data 109 (e.g., mobile phone number) from consumer 101 so that merchant 130 has identifier data 109 to send a communication request or opt-in message to consumer 101 for registering form of payment 102 with consumer program 160. The communication request may include the activation code. The communication request may also provide instructions for consumer 101 and/or client device 103, 104 to register in the consumer program 160 using the activation code. In some embodiments, the communication request may require the consumer 101 to go to a web site to enter the activation code to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, the follow-up communication may require consumer 101 to enter the activation code on a web site to complete registration. In other embodiments, consumer 101 may be automatically registered using the activation code without having to access a web site or submit any further information. In some embodiments, consumer 101 may need to agree to certain terms and conditions of consumer program 160.

At step 506, if system 100 determines that the form of payment 102 is associated with a consumer program 160 or qualifying consumer reward, system 100 may automatically apply any qualifying consumer rewards, to the purchase as indicated in steps 508, and 510.

Illustrated in FIG. 6 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 6 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using an activation code printed on a receipt 606 at the POS terminal 632. The receipt 606 provided by POS terminal 632 may include the activation code associated with the consumer's 101 form of payment 602, as described in FIG. 5. The receipt 606 may also include instructions for consumer 101 to register in consumer program 160 using the activation code. For example, the receipt 606 may include instructions for consumer 101 to enter the activation code on a web site associated with the consumer program 160. In an embodiment, the receipt 606 may also include instructions for the consumer 101 to provide identifier data 109 (e.g., client address, mobile wallet identifier, phone number, e-mail address, name of consumer 101, address of consumer 101, username, etc.) to merchant 130 (or any other element in FIG. 1) to complete registration in consumer program 160.

Illustrated in FIG. 7 is an exemplary block diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 7 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using an activation code associated with a consumer's 101 form of payment 702 that is sent to the consumer's 101 client device 703, 704 using a communication request. Consumer 101 uses a form of payment 702 at merchant 130. System 100 may determine if form of payment 102 is registered with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with a consumer program 160 or consumer reward associated with merchant 130.

If form of payment 102 is not registered, system 100 may generate an activation code that associates the consumer's 101 form of payment 102 with the consumer program 160 or consumer reward. The system 100 may request consumer 101 to opt-in to consumer program using the activation code. In one embodiment, the activation code may be printed on a receipt presented to consumer 101 at the POS terminal 132. The receipt may also include instructions for a consumer 101 to register in a consumer program 160 using the activation code. For example, the receipt may include instructions for the consumer 101 to enter the activation code on a web site associated with the consumer program 160. The receipt may also include instructions for the consumer 101 to enter additional identifier data 109 on the web site associated with the consumer program 160 in order to complete registration. The activation code associated with consumer's 101 form of payment 702 presented at the POS terminal 432 may be sent to the consumer's 101 client device 703, 704 using a communication request. The communication request may be sent to the consumer's 101 client device 703, 704, via e-mail, text message, near-field communication (e.g., Bluetooth, Wi-Fi, etc.), or other electronic communication means. The communication request may include instructions for consumer 101 to register in consumer program 160. For example, the communication request may include instructions for consumer 101 to enter the activation code on a web site associated with the consumer program 160. The communication request may include instructions for consumer 101 to enter additional identifying data 109 to complete registration in the consumer program 160.

Illustrated in FIG. 8 is an exemplary flow diagram illustrating an embodiment for registering in the consumer program 160 of the system 100 of FIG. 1. This figure illustrates the interaction between some of the system elements described in FIG. 1. While there are certain elements shown in FIG. 1 that are not illustrated in FIG. 8 and vice versa, one of ordinary skill in the art would be able to advantageously describe with respect to one figure in order to achieve the advantages described herein for operation with the embodiments shown in other figures. All such embodiments are understood by one of ordinary skill in the art to be encompassed within the present specification. Within the system 100 of FIG. 1, consumer 101 may register in a consumer program 160 using a network 105. At step 802, consumer 101 may log on to or access a network 105 (e.g., a Wi-Fi network of a merchant 130). At step 804, network 105 may request an identifier 109 of consumer 101. In some embodiments, network 105 may request an identifier 109 associated with client device 103, 104 (e.g., phone number of mobile device) or consumer 101 (e.g., username for a web site). Consumer 101 may provide the requested identifier 109 to the network 105 using their client device 103, 104. In some embodiments, the identifier 109 may be automatically obtained by the network 105.

At step 806, consumer 101 may agree to enroll in a consumer program 160. In some embodiments, consumer 101 may be presented with and agree to the terms and conditions for registering in a consumer program 160 via client device 103, 104, such as a mobile device. An opt-in message may provide instructions for consumer 101 and/or client device 103, 104 to register in consumer program 160. The process for registering a consumer 101 may have one or many steps to complete the registration. In some embodiments, consumer 101 and/or form of payment 102 may be automatically registered into consumer program 160 during the process of accessing the network 105. Consumer 101 can opt-in and register in consumer program 160 via client device 103, 104 seamlessly and easily. In some embodiments, a communication request may require the consumer 101 to reply with another communication, such as "Y" or "Yes," to confirm enrollment in the consumer program 160. Upon confirming enrollment, system 100 may send a follow-up communication that welcomes consumer 101 to the consumer program 160. In some embodiments, the follow-up communication may require consumer 101 to complete one or more steps via a web site or other means to complete registration. In some embodiments, consumer 101 may be automatically registered without having to access a web site or submit any further information.

At step 808, consumer 101 may receive and accept an offer associated with a merchant 130. In some embodiments, the offers received by consumer 101 may be based on the network 105 access by consumer 101 and/or the geolocation of consumer 101 that may be determined by the geolocation of client device 103, 104. At step 810, consumer program 160 may receive the requested identifier 109 and the accepted offer. The mechanism in which consumer 101 may accept an offer may occur in any manner. For example, consumer 101 may receive an offer via text message and communicate via text message that consumer 101 accepted the offer presented. In other embodiments, consumer's 101 client device 103, 104 may be automatically directed to a web site having an offer, and consumer 101 may click to accept the offer. System 100 may receive consumer's 101 acceptance of one or more offers and/or an identifier 109 associated with consumer 101 or consumer's 101 client device 103, 104 in real-time. In some embodiments, system may link the accepted offer to the account of the consumer program 160 associated with the identifier 109.

At step 812, consumer 101 may use a form of payment 102 to make purchase at merchant 130. At step 814, system 100 may determine if form of payment 102 is registered with an account associated with a consumer program 160 or consumer reward associated with merchant 130. For example, upon presentment of form of payment 102, merchant 130 and/or POS terminal 132 and/or payment system 140 and/or consumer program 160 may automatically determine if the form of payment 102 used to make the purchase is associated with an account of a consumer program 160 or consumer reward associated with merchant 130. If form of payment 102 is registered, the flow continues at step 826. If form of payment 102 is not registered, the flow continues at step 816.

At step 816, system 100 may instruct the POS terminal 132 to request the cashier to obtain an identifier 109 from consumer 101. In some embodiments, the requested identifier 109 may be the same identifier 109 previously provided by consumer 101 or consumer's 101 client device 103, 104 to gain access to the network 105. For example, the requested identifier 109 may be associated with client device 103, 104 (e.g., phone number of mobile device) or associated with consumer 101 (e.g., username for a web site). The mechanism in which merchant 130 can request the identifier 109 may occur in any manner. In some embodiments, the merchant 130 or consumer 101 may input the requested identifier 109 into POS terminal 132. In some embodiments, merchant 130 (or any other element in FIG. 1, such as consumer program 160) may initiate a communication (e.g., e-mail, text message, web-page, post to consumer's 101 social web site, near field communication, employee of merchant 130 asking consumer 101, etc.) to client device 103, 104 requesting the identifier 109. At step 818, the requested identifier 109 and information associated with the form of payment 102 (e.g., a cookie) may be transmitted to and received by the consumer program 160. In some embodiments, the identifier 109 may be automatically obtained by the POS terminal 132.

At step 820, consumer program 160 may automatically determine that the identifier 109 received during the transaction at the merchant 130 is associated with the same account for a consumer program 160 as the identifier 109 obtained by the network 105 that presented the consumer 101 with the offer that was accepted by consumer 101. In some embodiments, the identifiers 109 may be identical (e.g., the phone number of mobile device.) In some embodiments, the identifiers 109 may be different (e.g., identifier 109 from network 105 may be a phone number of mobile device and identifier 109 from POS terminal 132 may be a username). In some embodiments, system 100 may store and/or link the information associated with the form of payment 102 to consumer's 101 consumer program 160 account.

At step 822, system 100 may automatically apply the accepted offer (e.g., discount, gift, coupon, etc.) that was previously received by consumer 101 from the network 105, or any qualifying consumer rewards, to the purchase during the point of sale. Thus, the present disclosure allows for consumers 101 to seamlessly register for and accept targeted offers for merchants 130 in their areas to immediately take advantage of an offer for a purchase at a nearby merchant 130. Upon use of the form of payment 102, merchant 130 may send an Authorization Request ("AR") to the payment system 140. In such a transaction, entity logically referred to here as payment system 140 may be comprised of a credit clearing bank or acquiring bank computer system that communicates with the merchant 130, a credit card issuing computer system that manages the cardholder/consumer 101 accounts, and a credit card association server that is associated with the particular credit card association, such as Visa® or MasterCard®. These various servers all communicate in order to clear the ARs and reconcile the cardholders' credit card statements. Once the AR has been cleared, the payment system 140, which as discussed above comprises the servers of one or more entities, may send an Approval Code ("AC") back to the merchant 130 for the requested transaction. This transaction will also trigger the redemption of the accepted offer that was previously received by consumer 101 from the network 105, or any other qualifying consumer rewards, for purchases associated with merchant 130, although there are a number of possible methods by which this redemption can be accomplished. At step 424, the discounted amount from the accepted offer obtained via the network 105, or discounts from any other qualifying consumer reward, are automatically reflected in the receipt printed off at the point of sale.

At step 826, if system 100 determines that the form of payment 102 is associated with an account having a consumer program 160 or qualifying consumer reward, system 100 may automatically apply the accepted offer obtained via the network 105, or any other qualifying consumer rewards, to the purchase as indicated in steps 822, and 824.

Figure 9A:
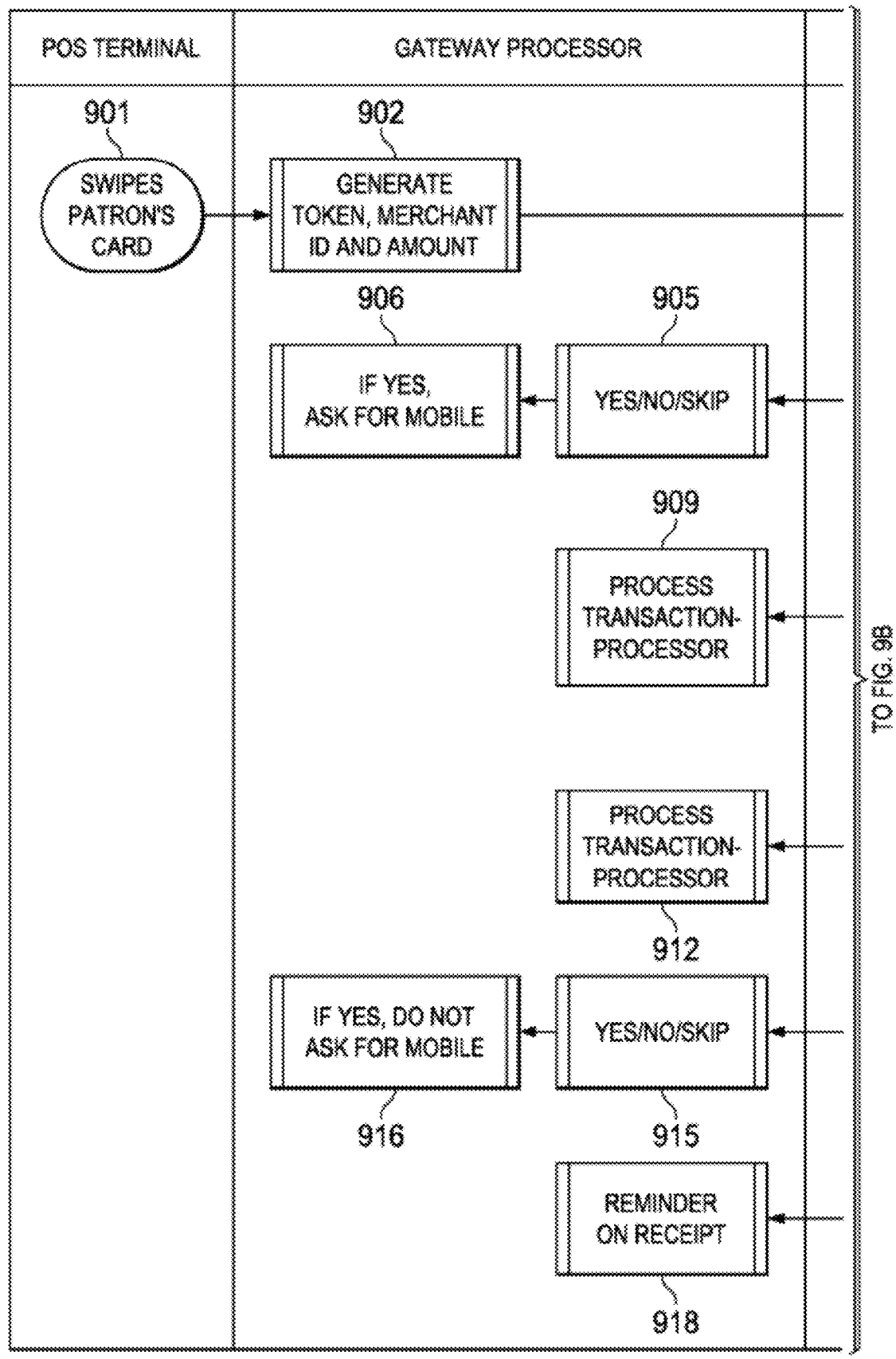
FIGS. 9A-9B are an exemplary flow diagram illustrating an embodiment of the disclosed principles.
Figure 9B:
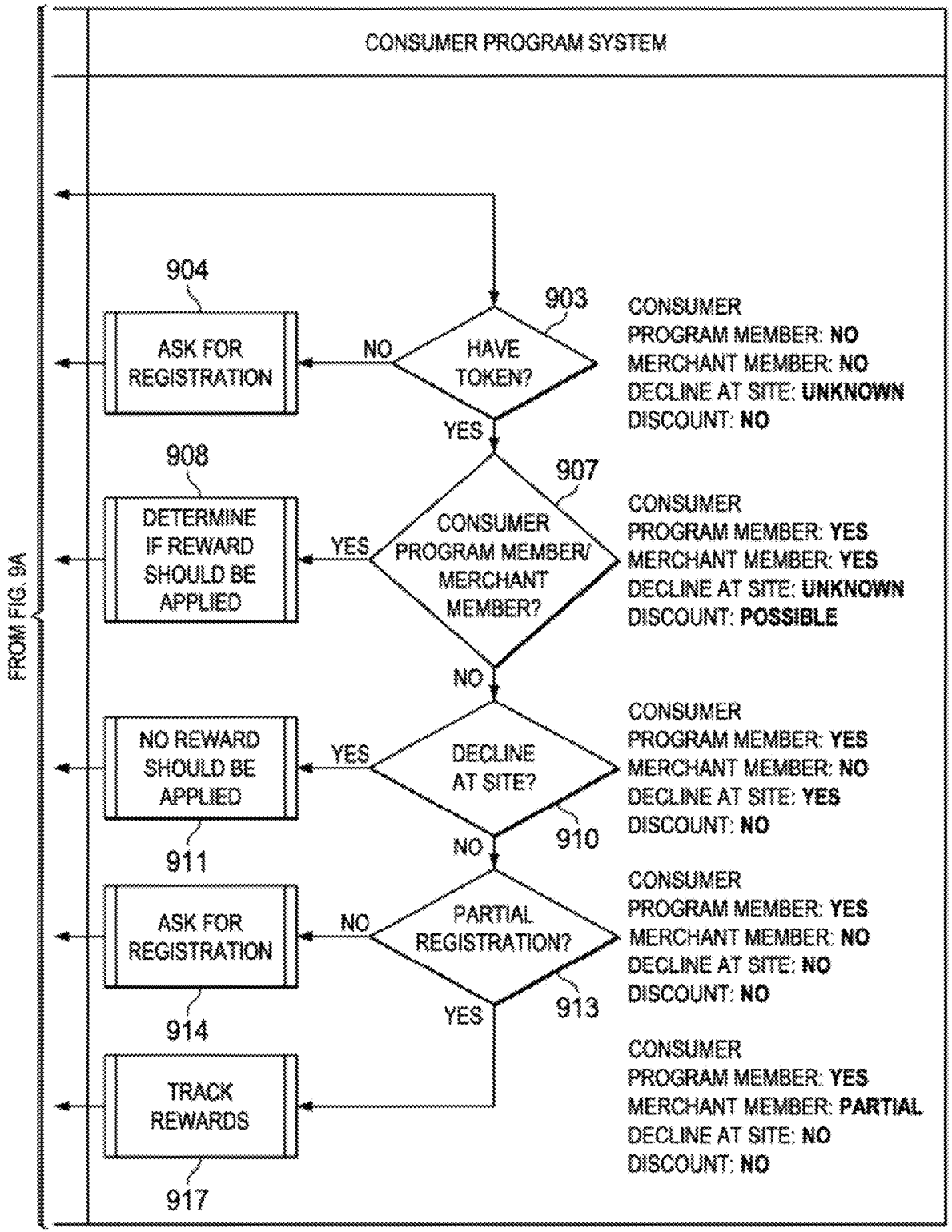

Illustrated in FIGS. 9A-9B is an exemplary flow diagram illustrating an embodiment for registering in the consumer program 160 of the system 100 of FIG. 1. At action 901, consumer's 101 form of payment 102 is swiped at the POS terminal 132. At action 902, gateway processor 150 generates a token, merchant ID, and amount, and sends the same to the consumer program system 190. In an embodiment, the token may be generated by payment system 140 At action 903, the consumer program system 190 determines whether the consumer program system 190 has the token. If the consumer program system 190 does not have the token, the consumer program system 190 asks for registration at action 904. At action 905, gateway processor 150 asks whether consumer 101 wants to register, not register, or skip registration. If the consumer 101 says yes to registration, gateway processor 150 asks for the consumer's 101 mobile number. Consumer 101 may then register in consumer program 160 by responding to a text message may sent to the consumer's 101 client device 103, 104, or entering an activation code sent the client device 103, 104 on a website.

If the consumer program system 190 does not have the token, the process continues at action 907. At action 907, the consumer program system 190 determines whether the consumer 101 is a consumer program 160 member and a merchant 130 member. If consumer 101 is a consumer program 160 member and a merchant 130 member, consumer program system 190 determines that a consumer reward should be applied at action 908, and gateway processor 150 processes the transaction with the consumer reward at action 909.

If consumer 101 is a consumer program 160 member, but is not a merchant 130 member, then the process continues at action 910. At action 910, consumer program system 190 determines whether consumer 101 declined registration at merchant 130. If consumer 101 did decline registration at merchant 130, consumer program system 190 instructs gateway processor 150 that no reward should be applied at action 911, and gateway processor 150 processes the transaction at action 912 without applying any rewards. If consumer 101 did not decline registration at merchant 130, the process continues at action 913. At action 913, the consumer program system 190 determines whether there is partial registration. If there is no partial registration, the consumer program system 190 asks for registration at action 914. At action 915, gateway processor 150 asks whether consumer 101 wants to register, not register, or skip registration. If consumer 101 wants to register, the system does not ask for consumer's 101 mobile number. If there is partial registration, consumer program system 190 tracks rewards at action 917, and gateway processor 150 instructs POS terminal 132 to print a reminder on the receipt at action 918.

The steps illustrated in FIGS. 3, 5, 8 and 9A-9B may be combined, modified, or deleted where appropriate, and additional steps may also be added to those shown. Additionally, the steps may be performed in any suitable order without departing from the scope of the present disclosure.

References to credit cards in the specific embodiments above should be understood to refer broadly to other payments systems and methods such as debit cards, electronic payment systems, automated billing systems, or other payment systems, including other billing systems described in this application. "Coupons," "coupon offers," and "promotional offers" and "rewards" should be broadly construed to include tickets, vouchers purchased for value, and other items that are redeemable or otherwise have value, such as frequent flyer miles or other "points" or "credits" that may be redeemable for reward goods and/or services.

In all the above-described embodiments, the actual locations of the elements and the nature of the communications between different elements may be adapted depending on system design considerations. For example, depending on the relative locations of the user databases 162 and the sites receiving transaction data from the POS terminals 132, it may not be necessary to have redemption notices and coupon notices sent. Web sites and web servers associated with consumer programs 160 may be owned or operated by the merchant 130, payment system 140, rewards processing system 150, merchant headquarters 180, or other entity.

Figure 10:
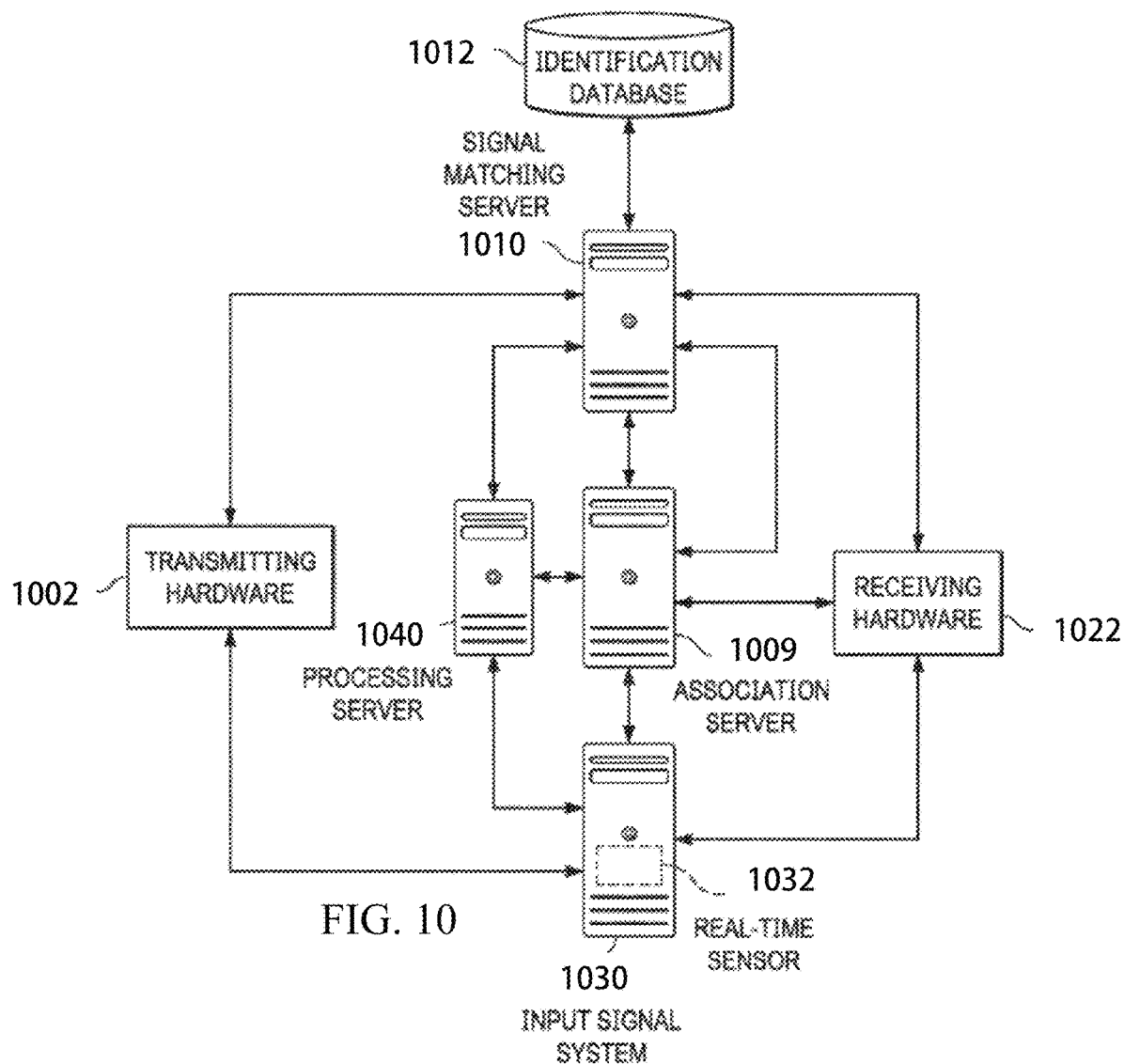
FIG. 10 is a block diagram of a complex computing network for modifying signal associations, in accordance with some embodiments of the invention.

FIG. 10 is a block diagram of a complex computing network for modifying signal associations in the complex computing network. FIG. 10 may comprise transmitting hardware 1002, an input signal system 1030 comprising a real-time sensor 1032, a processing server 1040, an association server 1009, receiving hardware 1022, a signal matching server 1010, and an identification database 1012. In some embodiments, the functionality of multiple devices in FIG. 10 may be combined in a single apparatus. The various servers described in this disclosure may refer to apparatuses, systems, devices, users, entities, etc. A server described herein may comprise a processor. Any processor described herein may be an intelligent processor. An intelligent processor may be a processor that learns of signal associations and executes computing operations based on the latest signal associations and signal disassociations, such apparatuses may also comprise memory that stores computer-readable code, which when executed by the processor, causes the processor and/or other elements in the apparatus to perform the various methods described in this disclosure. In some embodiments, the term, "signal" may refer to "data" or "information". In some embodiments, the association server 1009 and the signal matching server 1010 may be integrated into a single server. In some embodiments, even though some of the systems of FIG. 10 are not indicated as being connected, they may be connected to each other. In some embodiments, any signal described herein may be transitory. In some embodiments, the terms "using" and "based on" may be equivalent.

In some embodiments, any system described herein may comprise a housing that includes various units. The units may include a processor, a memory unit, an input/output unit, and a communication interface. In some embodiments, a chipset may be disposed in the housing and may be interfaced with the processor such as a signal processor. The chipset may have hardware (e.g., electronic components in an electronic circuit) for supporting various connections within the system (e.g., between units), or any other connection from the system to external systems or devices. The chipset may be an intelligent chipset for initiating an intelligent computing operation or an association or disassociation operation as described herein.

The transmitting hardware 1002 may be associated with a first signal or may produce a first signal. The transmitting hardware 1002 may be a computing device such as a mobile computing device. Alternatively, the transmitting hardware 1002 may be non-computing hardware (e.g., a physical card). An input signal system 1030 may comprise a real-time sensor 1032. In some embodiments, the real-time sensor 1032 may be a point-of-sale terminal such as a computing device (e.g., a mobile computing device, a non-mobile computing device). In some embodiments, the real-time sensor 1032 may refer to any real-time means or computing means. The transmitting hardware 1002 may transmit a first signal and the real-time sensor 1032 may sense (e.g., determine, receive, etc.) the first signal. Any sensor described in this disclosure may be a signal sensor. The first signal may be transmitted to the processing server 1040 which executes a computing operation based on the first signal.

A first system associated with the first signal may transmit a message to a second system associated with the second signal. The message may be transmitted over a network (e.g., a social network, a computing network, etc.). The first and second systems may be mobile devices such as mobile phones, tablets, watches, etc. The message may include an intention of transmitting a matching signal to a system associated with the second signal.

In some embodiments, the first signal may be associated with a matching signal. In some embodiments, a computing operation may need to be performed (e.g., based on or using the first signal) in order to associate the matching signal with the first signal. In some embodiments, the first signal may be associated with a matching signal upon the first signal being registered with the signal matching server 1010. In some embodiments, the matching signal may be stored in at least one of the signal matching server 1010 or the association server 1009, and the association of the matching signal with the first signal may be stored in at least one of the signal matching server 1010 or the association server 1009.

In some embodiments, it may be needed to transfer or transmit the matching signal from being associated with the first signal to being associated with the second signal. The need for transfer may be based on a request signal transferred or transmitted to any of the systems described herein (e.g., the association server 1009 and/or the signal matching server 1010) from the system associated with the first signal. Upon receiving the transfer request, a determination may be made of whether the second signal is registered with the signal matching server 1010. In response to the request signal, a notification signal may be transmitted to a system associated with the second signal. In some embodiments, the system associated with the first signal may comprise the transmitting hardware 1002, and the system associated with the second signal may comprise the receiving hardware 1022.

If the second signal is already registered with the signal matching server 1010, then the notification signal may notify the system associated with the second signal that the second signal is now associated with the matching signal. Alternatively, the notification signal may notify the system associated with the second signal that an acceptance signal may need to be transmitted from the system to in order establish the association. If the second signal is not already registered with the signal matching server 1010, then the second signal may need to register with the signal matching server 1010. In some embodiments, registration comprises providing identification information associated with the second signal (and/or identification information associated with a system or user associated with the second signal). Upon acceptance or automatic acceptance of the association between the second signal and the matching signal, the first signal is disassociated from the matching signal. In some embodiments, while the first signal is disassociated from the matching signal, the first signal may continue to be virtually associated (or loosely associated) with the matching signal and/or the second signal. Any computing operation that is executed based on both the second signal and the matching signal may result in modification of an attribute associated with the first signal or association of a provisioning signal (e.g., a new matching signal) with the first signal. In order to make this modification happen, either the matching signal or the second signal is virtually associated with the first signal.

The second signal may be used in a computing operation at the input signal system 1030. In some embodiments, the computing operation may be executed using an interaction with the receiving hardware 1022. The input signal system 1030 may forward the second signal to the processing server 1040. The processing server 1040 and/or the input signal system 1030 may determine whether the second signal is associated with a matching signal. In order to determine whether the second signal is associated with a matching signal, the input signal system 1030 and/or the processing server 1040 may communicate with the association server 1009 and/or the signal matching server 1010 and/or the identification database 1012 (which may store identification signals and first and/or second signals associated with matching signals). A search may be conducted by at least one of the association server 1009 and/or the signal matching server 1010 and/or the identification database 1012 to determine whether the second signal is associated with a matching signal. If a matching signal is not found, the processing server 1040 executes a computing operation based on the second signal. If a matching signal is found, the processing server 1040 executes a computing operation based on the both, or at least one of, the second signal and the matching signal.

In some embodiments, if a matching signal is found, the determination is communicated to the input signal system 1030. At the input signal system 1030, a scan may be conducted (either before or after initiating and/or completing the process of determining whether a matching signal is associated with the second signal) to determine the resources (e.g., items, services, etc.) for which the computing operation is to be executed or has been executed. The scan may result in a list of resource signals. The list of resource signals may be associated with a particular session or transaction. In some embodiments, the matching signal may have been previously associated with a particular resource or resource signals. Therefore, the input signal system 1030 (and optionally in coordination with the association server 1009, the signal matching server 1010, and/or the identification database 1012) may compare the matching signal with the list of resource signals to determine whether there is a match. If there is a match, then the computing operation is executed (e.g., by the processing server 1040) based on both the second signal and the matching signal. If there is no match, then the computing operation is executed based on just the second signal.

In some embodiments, upon execution (e.g., after or simultaneously with) of the computing operation based on both the second signal and the matching signal, a provisioning signal may be transmitted to a system associated with the first signal. The provisioning signal may comprise a new matching signal. The provisioning signal may not be transmitted to the system associated with the first signal if the computing operation is executed based on only the second signal and not based on the matching signal.

In some embodiments, any of the systems described herein may comprise application programming interfaces (APIs) for communicating with any of the other systems described herein. These APIs may be specialized non-generic APIs that are developed for the particular purpose of communicating with particular systems. In some embodiments, a method is provided for performing the various steps performed by any apparatus described herein. In some embodiments, a non-transitory computer-readable medium comprising code is provided for causing a computing device to perform the various methods described herein.

In some embodiments, the various devices of FIG. 10 correspond to and are the equivalent of devices with the same reference numerals (or different reference numerals) of FIG. 10 in the applications incorporated-by-reference below, even though some of the devices of FIG. 10 in the instant application carry different names from the devices of FIG. 10 in the applications incorporated-by-reference below. Although not shown, in some embodiments, the various devices of FIG. 10 include the same elements that are comprised in the devices associated with the same reference numerals (or different reference numerals) of FIG. 10 in the applications incorporated-by-reference below. In some embodiments, the various devices of FIG. 10 perform the same or similar operations as the devices associated with the same reference numerals (or different reference numerals) of FIG. 10 in the applications incorporated-by-reference below. Therefore, in some embodiments, the transmitting hardware 1002 may be a form of payment 1002, the input signal system 1030 may be the merchant 1030, the real-time sensor 1032 may be the POS terminal 1032, the association server 1009 may be the vGift store 1009, the processing server 1040 may be the payment system 1040, the signal matching server 1010 may be card matching server 1010, the identification database 1012 may be the user database 1012, and the receiving hardware 1022 may be the form of payment 1022.

Figure 11:
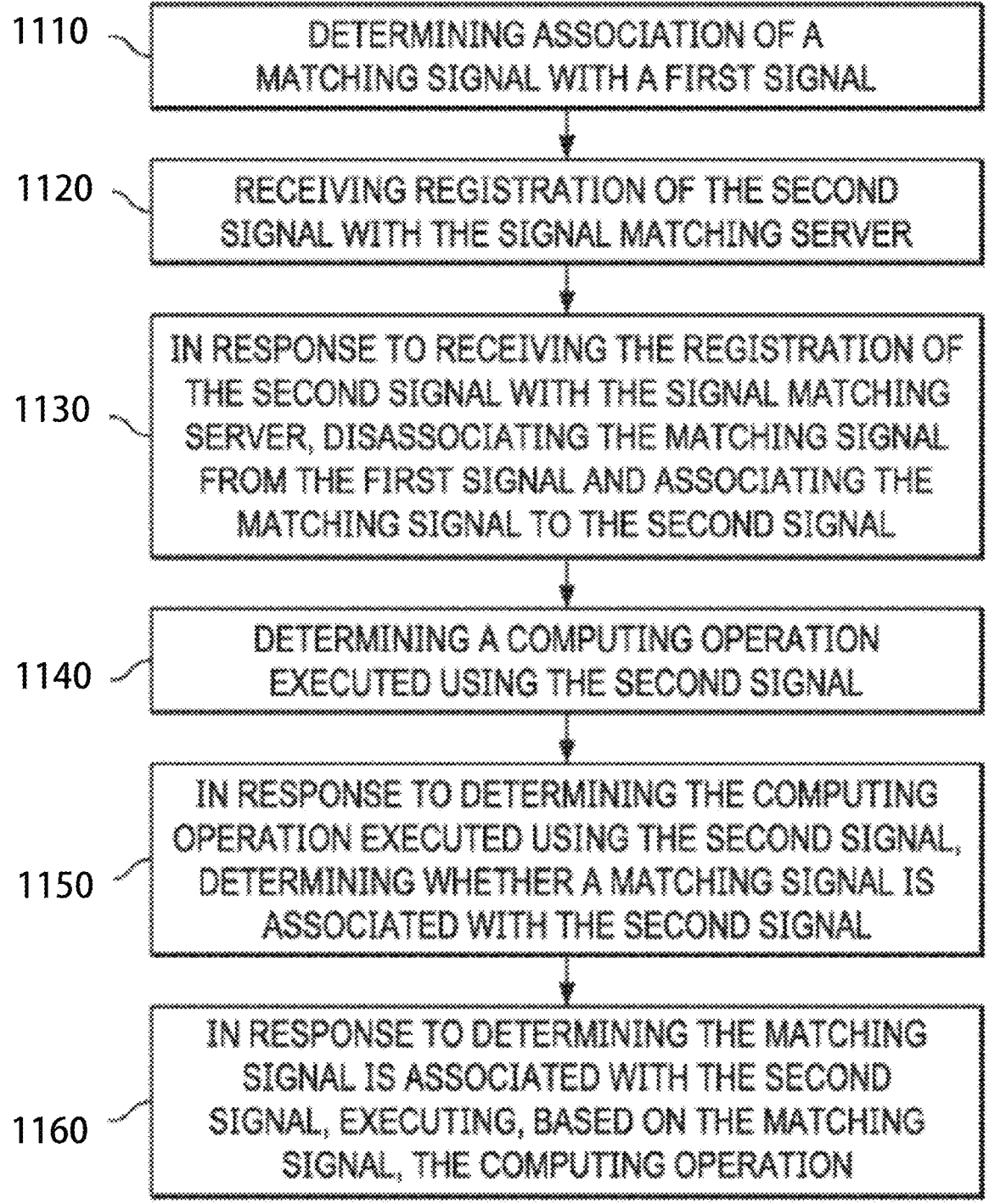
FIG. 11 is a block diagram of a method for modifying signal associations in a complex computing network, in accordance with some embodiments of the invention.

FIG. 11 is a block diagram of a method for modifying signal associations in a complex computing network. The various blocks of FIG. 11 may be executed in a different order from that shown in FIG. 11. At block 1110, the method comprises determining association of a matching signal with a first signal. In some embodiments, the first signal is unaffected by the association of the matching signal with the first signal. At block 1120, the method comprises receiving registration of the matching signal with a second signal. At block 1130, the method comprises in response to receiving the registration of the matching signal with the second signal, disassociating the matching signal from the first signal and associating the matching signal to the second signal. In some embodiments, the first signal is unaffected by the disassociation of the matching signal with the first signal, and the second signal is unaffected by the association of the matching signal with the second signal. At block 1140, the method comprises determining a computing operation executed using the second signal. At block 1150, the method comprises in response to determining the computing operation executed using the second signal, determining whether a matching signal is associated with the second signal. At block 1160, the method comprises in response to determining the matching signal is associated with the second signal, executing, based on the matching signal, the computing operation. In some embodiments, execution of the computing operation affects (e.g., a decreases or extinguishes entirely) an attribute (e.g., a numerical amount) of the second signal or the matching signal. In some embodiments, an attribute could represent a value associated with a signal. In some embodiments, execution of the computing operation (associated with the second signal and the matching signal) affects (e.g., increases) an attribute (e.g., a numerical amount) of the first signal. As described herein, the signal matching server may refer to at least one of the signal matching server, the association server, and/or the identification database presented in FIG. 10. The present application incorporates-by-reference (IBR) the entirety of U.S. application Ser. No. 13/231,946, filed Sep. 13, 2011, titled "Systems and Methods for Virtual Transferring of Gifts," for all purposes.

The present application incorporates-by-reference the entirety of U.S. Application No. 61/382,464, filed Sep. 13, 2010, titled "Systems and Methods for Virtual Transferring of Gifts," for all purposes.

The present application incorporates-by-reference the entirety of U.S. application Ser. No. 15/076,876, filed Mar. 22, 2016, titled "Real-time Sensors in Complex Computing Networks," for all purposes.

In some embodiments, the transmitting or receiving hardware may comprise a mobile device such as a mobile phone, watch, fitness band, etc. In such embodiments, the signal transmitted from the transmitting or receiving hardware may comprise a signal (e.g., an identification signal) that is unique to the mobile device or to an account associated with the mobile device. For example, such a signal may be a mobile device phone number, or any other device identification numbers. In some embodiments, the mobile device may comprise or have access to (e.g., from a cloud server) digital versions of multiple transmitting or receiving hardware. In some embodiments, the mobile device may include functionality of both the transmitting or receiving hardware and the input signal system. Therefore, the mobile device may perform any process or comprise any feature that is described with respect to the transmitting or receiving hardware and/or the input signal system. For example, any message that may be presented on the display associated with the real-time sensor or the input signal system, may additionally or alternatively be presented on a display of the mobile device. In some embodiments, any of the systems illustrated in FIG. 10 (e.g., the input signal system) may determine that the transmitting or receiving hardware is a mobile device. In response to determining that the transmitting or receiving hardware is a mobile device, the system may prompt the mobile device for transmission of the first or second signal.

In some embodiments, any transmissions between the mobile device and any of the systems may be via any short range (e.g., near field communication, Bluetooth, Bluetooth Low Energy, etc.) or long range wireless transmission mechanisms (e.g., cellular, Wi-Fi, etc.). In some embodiments, the frequency of transmission may not be limited to any particular frequency of the electromagnetic spectrum.

The present invention may have uses in many fields, such as computing science and software, electronic commerce, digital signal processing, medical software, etc. Any exemplary uses are described herein are for illustration purposes only. In some embodiments, the first signal or the second signal may comprise payment information such as payment card information. In some embodiments, the transmitting or receiving hardware may comprise a card such as a payment card, an identification card, a loyalty card, etc., or a device such as a payment device, or mobile device such as a mobile phone or watch. The card may be associated with an amount. In some embodiments, the matching signal may comprise a virtual gift or Vgift, a coupon, a gift card, an offer, a discount, a deal, etc. In some embodiments, a computing operation may refer to a payment operation. Executing a computing operation based on a first or second signal and a matching signal may result in a discount for a purchased resource or service. Executing a computing operation based on just the first or second signal, and not the matching signal, may not result in a discount for a purchased resource or service. A matching signal may be movable because it can be associated and disassociated with first and second signals. A signal may be temporal because it may be associated with a certain validity period. A provisioning signal as described herein may be a reward. An identification signal may be identification information for a user or entity associated with the first or second signal. A real-time computing operation may be a payment operation executed at a point-of-sale terminal. In some embodiments, the matching signal may be associated with a particular purchase item or resource. Upon scanning a shopping cart, a determination may be made whether a purchase item (e.g., a signal associated with the purchase item) matches the matching signal. In some embodiments, a value associated with a signal may refer to an amount of funds associated with a payment card, a virtual gift, a gift card, a coupon, etc. Increasing the value of a signal may represent a deposit while decreasing the value of a signal may refer to a withdrawal. A session or transaction described herein may be a purchase or shopping transaction or session.

As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation."

There is a need for using a single input signal to perform disparate computing operations in a complex computing network without needing to use different input signals for performing the disparate computing operations.

Figure 12:
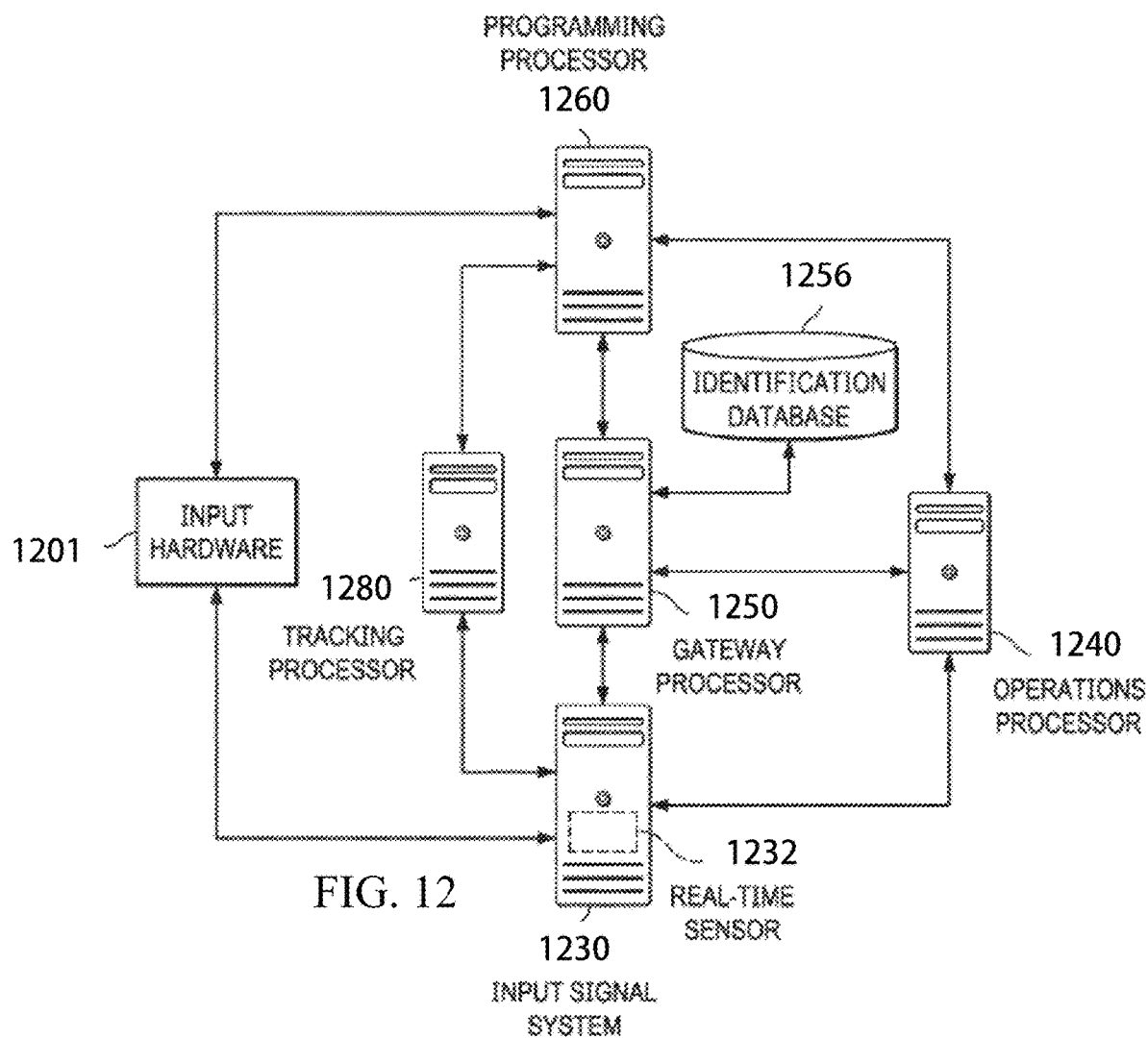
FIG. 12 is a block diagram of a complex computing network for real-time routing of an input signal received from a real-time sensor to perform disparate computing operations in the complex computing network, in accordance with some embodiments of the invention.

FIG. 12 is a block diagram of a complex computing network for real-time routing of an input signal received from a real-time sensor to perform disparate computing operations in the complex computing network. FIG. 12 may comprise an input hardware 1201, an input signal system 1230, an operations processor 1240, a gateway processor 1250, a programming processor 1260, and a tracking processor 1280. In some embodiments, the various processors described herein may be replaced with other types of processors. In some embodiments, the functionality of multiple devices in FIG. 12 may be combined in a single apparatus. The various processors described in this disclosure may refer to apparatuses, systems, devices, etc., comprising such processors. Such apparatuses may also comprise memory that stores computer-readable code, which when executed by the processor, causes the processor and/or other elements in the apparatus to perform the various methods described in this disclosure. In some embodiments, the term "signal" may refer to "data" or "information."

The input hardware 1201 may produce an input signal. The input hardware 1201 may be a computing device such as a mobile computing device. Alternatively, the input hardware 1201 may be non-computing hardware (e.g., a physical card). An input signal system 1230 may comprise a real-time sensor 1232. In some embodiments, the real-time sensor 1232 may be a point-of-sale terminal such as a computing device (e.g., a mobile computing device, a non-mobile computing device). In some embodiments, the real-time sensor 1232 may refer to any real-time means or computing means. The input hardware 1201 may transmit an input signal and the real-time sensor 1232 may sense (e.g., determine, receive, etc.) the input signal. Any sensor described in this disclosure may be a computing device. In some embodiments, a sensor in this disclosure may be a signal sensor. The input signal may be transmitted to at least one of the gateway processor 1250 (e.g., on a first connection), the operations processor 1240 (e.g., on a second connection), or the tracking processor 1280 (e.g., on a fourth connection). In some embodiments, the connection between the gateway processor 1250 and the identification database 1256 (e.g., associated with a loyalty program) may be remembered as a third connection.

In some embodiments, a portion of the input signal (e.g., the identification signal) is extracted by the input signal system 1230 or the real-time sensor 1232 and is transmitted to at least one of the gateway processor 1250, the operations processor 1240, or the tracking processor 1280. In some embodiments, either different portions and/or the same portion of the input signal are transmitted to at least one of the gateway processor 1250, the operations processor 1240, or the tracking processor 1280. In some embodiments, the input signal may be transformed by the input signal system 1230 into one or more transformed signals, and each of the different transformed signals may be transmitted to at least one of the gateway processor 1250, the operations processor 1240, or the tracking processor 1280. In some embodiments, each of the first connection, the second connection, the third connection, and the fourth connection may be distinct such that the only the gateway processor 1250, and not the operations processor 1240, may communicate with the input signal system 1230 on the first connection, only the operations processor 1240, and not the gateway processor 1250, may communicate with the input signal system 1230 on the second connection, etc. In alternate embodiments, at least one of the first connection, the second connection, the third connection, and the fourth connection may be coupled into a single connection.

In some embodiments, the gateway processor 1250 may include a signal communication interface for establishing a first connection to the input signal system 1230, and receiving the input signal on the first connection. In some embodiments, the gateway processor 1250 may comprise or may be associated with an identification sensor for identifying the identification signal in the input signal. The signal communication interface may also be used for establishing a third connection to an identification database 1256, and accessing records in the identification database 1256 on the third connection. In some embodiments, the identification database 1256 may be part of the gateway processor 1250, while in other embodiments, the identification database 1256 may be located remotely from the gateway processor 1250. The gateway processor 1250 may execute a first computing operation. The first computing operation may comprise comparing the identification signal in the input signal to a record in the identification database 1256, and determining whether the identification signal matches a record in the identification database 1256. In response to determining the identification signal does not match a record in the identification database 1256, the gateway processor 1250 may transmit to the input signal system 1230 a request for creating a record for the identification signal in the identification database 1256. In response to transmitting the request for creating a record for the identification signal in the identification database 1256, the gateway processor 1250 may receive a second signal from the input signal system 1230. The second signal may comprise a response to the request for creating a record for the identification signal in the identification database 1256. In some embodiments, the response may comprise acceptance of the request for creating a record for the identification signal in the identification database 1256. Alternatively, the response may comprise declining the request for creating a record for the identification signal in the identification database 1256.

The input signal transmitted on the second connection from the input signal system 1230 to the operations processor 1240 may be used by the operations processor 1240 to execute a second computing operation. The second computing operation executed by the operations processor 1240 may be different from the first computing operation executed by the gateway processor 1250. The second computing operation may be executed at least one of before, after, or substantially simultaneously with the first computing operation. While the disclosure indicates that the first computing operation and the second computing operation are executed by different processors, in other embodiments, the first computing operation and the second computing operation may be executed by the same processor.

In some embodiments, in response to determining the identification signal does not match a record in the identification database 1256, the gateway processor 1250 may transmit to the input signal system 1230 or to the operations processor 1240 (either directly or via the input signal system 1230) an indication that a record does not exist in the identification database 1256. In such embodiments, before the gateway processor 1250 transmits to the input signal system 1230, a request for creating a record for the identification signal in the identification database 1256, or before a request for creating a record for the identification signal in the identification database 1256 is presented at the real-time sensor 1232, the operations processor 1240 may execute the second computing operation. The operations processor 1240 may then communicate the completion of the second computing operation to the input signal system 1230 and/or the gateway processor 1250. The input signal system 1230, either on its own or based on a message received from the gateway processor 1250, may prompt the real-time sensor 1232 to sense a second input signal, which may be a request for creating a record for the identification signal in the identification database 1256. The second input signal may be the same as or different from the input signal. The second input signal (or an identification signal comprised in the second input signal) may be transmitted from the input signal system 1230 to the gateway processor 1250. The gateway processor 1250 may access the identification database 1256 to create a record in the identification database 1256 for the identification signal comprised in the second input signal. Therefore, in such embodiments, the identification signal in the first input signal may be used to determine whether a record for the identification sign al exists in the identification database 1256, and the identification signal in the second input signal may be used to create a record for the identification signal in the identification database 1256. The identification signal in the first input signal may either be the same as or different from the identification signal in the second input signal. However, both identification signals may be associated with the same input hardware.

In some embodiments, in response to determining the identification signal matches a record in the identification database 1256, the gateway processor 1250 may transmit to the input signal system 1230 or to the operations processor 1240 (either directly or via the input signal system 1230) an indication that a record exists in the identification database 1256. Additionally, the gateway processor 1250 may transmit a transformational attribute (e.g., a discount) that is applied to the input signal. Alternatively, the transformational attribute may be generated by the input signal system 1230 and/or the operations processor 1240 upon receiving the indication (e.g., from the gateway processor 1250) that a record exists in the identification database 1256. The transformational attribute may be applied to the input signal at least one of the input signal system 1230 and/or the operations processor 1240 and/or the gateway processor 1250. As an example, the transformational attribute may be applied to the input signal at least one of prior to, during, or after the second computing operation. In some embodiments, either prior to, during, or after execution of the second computing operation, the operations processor 1240 may transmit a message to the input signal system 1230. The message may be displayed on a display associated with the real-time sensor 1232. The message may be associated with the transformed input signal i.e., the result of applying the transformational attribute to the input signal.

In some embodiments, the functionality of the gateway processor 1250 may be performed by two separate processors that may interact with each other. One of the processors (e.g., a communications processor) may perform the functions of interacting with the input signal system 1230 such as receiving the input signal, the second input signal, or the identification signal, and transmitting a second signal to the input signal system 1230, and/or transmitting a prompt or prompting the real-time sensor 1232 in the input signal system 1230 for sensing a second input signal. The other processor (e.g., a matching processor) may perform the functions of interacting with the identification database 1256 and determining whether a matching record for the identification signal exists in the identification database 1256.

In some embodiments, the transmission, to the input signal 1230, of the request for creating a record of the identification signal in the identification database 1256 is further based on a location of the real-time sensor 1230. In some embodiments, the transmission, to the input signal system 1230, of the request for creating a record for the identification signal in the identification database 1256 is further based on an attribute of the second computing operation. In some embodiments, the signal communication interface is further used for establishing a connection to a programming processor 1260, wherein the programming processor transmits a trigger signal that causes sensing of the input signal at the real-time sensor 1232.

In some embodiments, the gateway processor 1250 further comprises a first application programming interface (API) for communicating with the programming processor 1260, and a second API different from the first API, for communicating with the input signal system 1240. These APIs may be specialized non-generic APIs that are developed for the particular purpose of communicating with particular devices.

In some embodiments, the input signal or the identification signal may be associated with a computing token or tokenized. Tokenization may be a form of data transformation. Therefore, the input signal and/or identification signal may be converted to a token or token signal. The input signal and/or identification signal may not be able to be recovered or retransformed from the token signal. In some embodiments, the token signal instead of or in addition to the input signal and/or the identification signal, may be used for performing the first computing operation described in this disclosure. In some embodiments, the token signal may be shared with other processors, or networks such as computing networks or social networks. The tokenization may be executed by at least one of the input signal system 1230 (and/or the real-time sensor 1232), the gateway processor 1250, or the operations processor 1240. In some embodiments, the gateway processor 1250 may execute a computing operation for storing a token (e.g., the token associated with the identification signal) in the record for the identification signal in the identification database 1256.

In some embodiments, a method is provided for performing the various steps performed by any apparatus described herein. In some embodiments, a non-transitory computer-readable medium comprising code is provided for causing a computing device to perform the various methods described herein.

In some embodiments, the various devices of FIG. 12 correspond to and are the equivalent of devices with the same reference numerals (or different reference numerals) of FIG. 12 in the applications incorporated-by-reference below, even though some of the devices of FIG. 12 in the instant application carry different names from the devices of FIG. 12 in the applications incorporated-by-reference below. Although not shown, in some embodiments, the various devices of FIG. 12 include the same elements that are comprised in the devices associated with the same reference numerals (or different reference numerals) of FIG. 12 in the applications incorporated-by-reference below. In some embodiments, the various devices of FIG. 12 perform the same or similar operations as the devices associated with the same reference numerals (or different reference numerals) of FIG. 12 in the applications incorporated-by-reference below.

Figure 13:
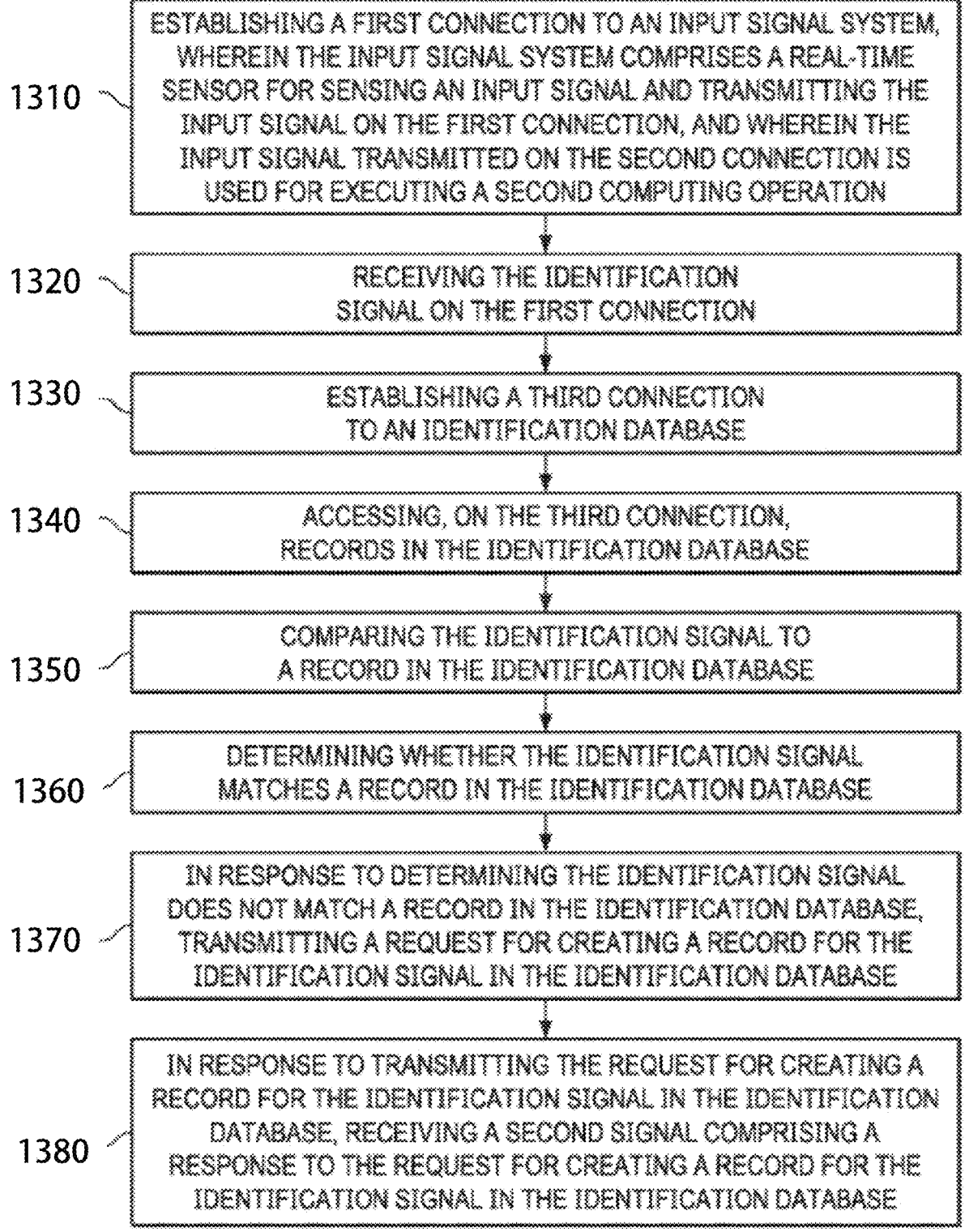
FIG. 13 is a block diagram of a method for real-time routing of an input signal received from a real-time sensor to perform disparate computing operations in a complex computing network, in accordance with some embodiments of the invention.

FIG. 13 is a block diagram of a method for real-time routing of an input signal received from a real-time sensor to perform disparate computing operations in a complex computing network, wherein but for the real-time routing of the input signal, which is necessarily rooted in computing technology, separate input signals would be needed for performing the disparate computing operations. The various blocks of FIG. 13 may be executed in a different order from that shown in FIG. 13. At block 1310, the method comprises establishing a first connection to an input signal system, wherein the input signal system comprises a real-time sensor for sensing (e.g., determining, receiving, etc.) an input signal and transmitting the input signal on a first connection and a second connection, wherein the input signal comprises an identification signal, wherein the input signal transmitted on the first connection is used for executing a first computing operation, and wherein the input signal transmitted on the second connection is used for executing a second computing operation. At block 1320, the method comprises receiving the input signal and/or the identification signal on the first connection. At block 1330, the method comprises establishing a third connection to an identification database. At block 1340, the method comprises accessing, on the third connection, records in the identification database.

At block 1350, the method comprises comparing the identification signal to a record in the identification database. At block 1360, the method comprises determining whether the identification signal matches a record in the identification database. At block 1370, the method comprises in response to determining the identification signal does not match a record in the identification database, transmitting to the input signal system or the real-time sensor, a request for creating a record for the identification signal in the identification database. At block 1380, the method comprises in response to transmitting the request for creating a record for the identification signal in the identification database, receiving a second signal from the input signal system or the real-time sensor, the second signal comprising a response to the request for creating a record for the identification signal in the identification database. In some embodiments, the response comprises acceptance of the request for creating a record for the identification signal in the identification database. In some embodiments, any signal as described herein may be a non-transitory signal. In other embodiments, any signal as described herein may be a transitory signal.

In some embodiments, the input signal is associated with a computing token. In some embodiments, the identification signal is associated with a computing token. In some embodiments, the input signal or the identification signal is tokenized. In some embodiments, the input signal or the identification signal is tokenized by the input signal system or by the input hardware such as a mobile device. In some embodiments, the input signal or the identification signal is tokenized by the gateway processor. In some embodiments, the input signal or the identification signal is tokenized by the operations processor. In some embodiments, the identification database is located remotely from the gateway processor, while in other embodiments, the identification database is coupled to the gateway processor. In some embodiments, the gateway processor is further configured for storing a computing token in the record for the identification signal in the identification database.

The present application incorporates by reference (IBR) the entirety of U.S. application Ser. No. 14/794,593, filed Jul. 8, 2015, titled "Systems and Methods for Enrolling Consumers in a Program," for all purposes.

The present application incorporates-by-reference the entirety of U.S. application Ser. No. 13/937,132, filed Jul. 8, 2013, titled "Systems and Methods for Registering Consumers in a Consumer Program While Accessing a Network," for all purposes.

The present application incorporates-by-reference the entirety of U.S. application Ser. No. 13/708,814, filed Dec. 7, 2012, titled "Systems and Methods for Registering Consumers in a Consumer Program While Accessing a Network," for all purposes.

The present application incorporates-by-reference the entirety of U.S. Provisional Application No. 61/568,637, filed Dec. 8, 2011, titled "Systems and Methods for Using a Payment System to Register Consumers in a Loyalty Program," for all purposes.

The present application is a continuation of U.S. application Ser. No. 15/147,884, filed May 5, 2016, titled "Modifying Signal Associations in Complex Computing Networks," which is a continuation-in-part of U.S. application Ser. No. 13/231,946, filed Sep. 13, 2011, titled "Systems and Methods for Virtual Transferring of Gifts," which is a non-provisional of U.S. Application No. 61/382,464, filed Sep. 13, 2010, titled "Systems and Methods for Virtual Transferring of Gifts," all of which are incorporated by reference herein for all purposes. The present application is also a continuation of U.S. application Ser. No. 15/076,876, filed Mar. 22, 2016, titled "Real-time Sensors in Complex Computing Networks," which is a continuation-in-part of U.S. application Ser. No. 14/794,593, filed Jul. 8, 2015, titled "Systems and Methods for Enrolling Consumers in a Program," which is a continuation-in-part of U.S. application Ser. No. 13/937,132, filed Jul. 8, 2013, titled "Systems and Methods for Registering Consumers in a Consumer Program While Accessing a Network," which is a continuation of U.S. application Ser. No. 13/708,814, filed Dec. 7, 2012, titled "Systems and Methods for Registering Consumers in a Consumer Program While Accessing a Network," which is a non-provisional of U.S. Provisional Application No. 61/568,637, filed Dec. 8, 2011, titled "Systems and Methods for Using a Payment System to Register Consumers in a Loyalty Program," all of which are incorporated by reference herein for all purposes.

In some embodiments, the input signal transmitted from the input hardware may comprise a second identification signal. In some embodiments, the input hardware may comprise this second identification signal. In some embodiments, the second identification signal may be a token or a number that is generated based on any components of the input signal. In some embodiments, the second identification signal may be dynamically generated at the time of transmitting the input signal to the input signal system, comprising the real-time sensor. In some embodiments, the second identification signal may be transmitted to the input signal system separately from the input signal and/or the identification signal. In some embodiments, the token described in this disclosure may be a type of second identification signal. As an example, the input signal may comprise an identification signal. Either the input signal or the identification signal may include a name, an input hardware number, an address, a phone number, or another number or alphanumeric quantity other than the numbers listed herein, etc. In some embodiments, the second identification signal and the identification signal may refer to the same signal, while in other embodiments, the second identification signal and the identification signal may refer to different signals.

In some embodiments, the second identification signal may not be secured or encrypted, unlike the input signal and/or the identification signal. In other embodiments, the second identification signal may be secured or encrypted as well; however the level of security or encryption of the second identification signal may be less than or equal to the level of security or encryption of the input signal or the identification signal. In some embodiments, any of the features or processes described in any part of this disclosure, including any applications incorporated herein by reference, that are associated with the input signal and/or the identification signal, may additionally or alternatively be associated with the second identification signal. Therefore, the second identification signal may be transmitted to the gateway processor, and the gateway processor may use the second identification signal to determine whether a matching record exists in the identification database. Additionally, the second identification signal may be used to create a new record in the identification database if a matching record does not exist in the database.

In some embodiments, the input hardware may comprise a mobile device such as a mobile phone, watch, fitness band, etc. In such embodiments, the identification signal and/or the second identification signal may comprise a signal that is unique to the mobile device or to an account associated with the mobile device. For example, such a signal may be a mobile device phone number, or any other device identification numbers. In some embodiments, the mobile device may comprise or have access to (e.g., from a cloud server) digital versions of multiple input hardware. In some embodiments, the mobile device may include functionality of both the input hardware and the input signal system. Therefore, the mobile device may perform any process or comprise any feature that is described with respect to the input hardware and/or the input signal system. For example, any message that may be presented on the display associated with the real-time sensor or the input signal system, may additionally or alternatively be presented on a display of the mobile device. In some embodiments, any of the systems illustrated in FIG. 12 (e.g., the input signal system) may determine that the input hardware is a mobile device. In response to determining that the input hardware is a mobile device, the system may prompt the mobile device for transmission of an input signal. The input signal transmitted from the mobile device may include at least one of the identification signal and/or the second identification signal.

In alternate embodiments, the input signal transmitted from the mobile device may not include the identification signal and/or the second identification signal, or may include just the identification signal and not the second identification signal. The input signal may include information necessary to perform the second computing operation. Following the second computing operation, any of the systems of FIG. 12 may prompt the mobile device for transmission of the identification signal and/or the second identification sign al. In some embodiments, any transmissions between the mobile device and any of the systems may be via any short range (e.g., near field communication, Bluetooth, Bluetooth Low Energy, etc.) or long range wireless transmission mechanisms (e.g., cellular, Wi-Fi, etc.). In some embodiments, the frequency of transmission may not be limited to any particular frequency of the electromagnetic spectrum.

In some embodiments, prior to transmission of the identification signal and/or the second identification signal to the system, the system may prompt the user of the mobile device for permission to transmit the identification signal and/or the second identification signal. For a subsequent transmission of the identification signal and/or the second identification signal at the same establishment (e.g., a single establishment may be associated with multiple geographical locations), permission of the user is not required to transmit the identification signal and/or the second identification signal to any of the described systems.

The system may determine, based on the identification signal and/or the second identification signal that a matching record associated with the identification signal and/or the second identification signal is not present in the identification database. In such embodiments, the system may send to the mobile device a request to the mobile device to create a record in the identification database. The mobile device may respond either positively or negatively in response to the request.

In some embodiments, the input hardware (e.g., the mobile device) may be associated with multiple identification signals and/or multiple second identification signals. In such embodiments, at least one of the identification signals or second identifications signals such as a mobile device number may be used to link together the multiple identification signals and/or the multiple second identification signals. This linking second identification signal may be the identifications signal that is used by the gateway processor to determine whether a matching record exists for the linking second identification signal in the identification database.

In some embodiments, an apparatus is provided for real-time routing of an input signal and an identification signal received from a mobile device via a real-time computing means to perform disparate computing operations in a complex computing network, wherein but for the real-time routing of the input signal and the identification signal, which is necessarily rooted in computing technology, the identification signal would need to be included in the input signal. The apparatus comprises a signal communication interface for: establishing a first connection to an input signal system, wherein the input signal system comprises a real-time computing means for sensing the input signal and transmitting the input signal on a first connection and for sensing the identification signal and transmitting the identification signal on a second connection, wherein the input signal transmitted on the first connection is used for executing a first computing operation, and wherein the identification signal transmitted on the second connection is used for executing a second computing operation; receiving the identification signal on the first connection; establishing a third connection to an identification database; and accessing, on the third connection, records in the identification database; and a gateway processor for executing the first computing operation, the first computing operation comprising: comparing the identification signal to a record in the identification database; determining whether the identification signal matches a record in the identification database; in response to determining the identification signal does not match a record in the identification database, transmitting to the input signal system or to a mobile device, a request for creating a record for the identification signal in the identification database; and in response to transmitting the request for creating a record for the identification signal in the identification database, receiving a second signal from the real-time sensor, the input signal system, or the mobile device, the second signal comprising a response to the request for creating a record for the identification signal in the identification database, wherein the input signal transmitted on the second connection is received by an operations processor that executes the second computing operation.

In some embodiments, an apparatus for real-time routing of an input signal and an identification signal received from an input data system to perform disparate computing operations in a complex computing network, wherein but for the real-time routing of the input signal and the identification signal, which is necessarily rooted in computing technology, the identification signal would need to be included in the input signal. The apparatus comprises a signal communication interface for: establishing a first connection to an input signal system, wherein the input signal system transmits the input signal on a first connection and transmits the identification signal on a second connection, wherein the input signal transmitted on the first connection is used for executing a first computing operation, and wherein the identification signal transmitted on the second connection is used for executing a second computing operation; receiving the identification signal on the first connection; establishing a third connection to an identification database; and accessing, on the third connection, records in the identification database; and a gateway processor for executing the first computing operation, the first computing operation comprising: comparing the identification signal to a record in the identification database; determining whether the identification signal matches a record in the identification database; in response to determining the identification signal does not match a record in the identification database, transmitting to the input signal system, a request for creating a record for the identification signal in the identification database; and in response to transmitting the request for creating a record for the identification signal in the identification database, receiving a second signal from the real-time sensor or the input signal system, the second signal comprising a response to the request for creating a record for the identification signal in the identification database, wherein the input signal transmitted on the second connection is received by an operations processor that executes the second computing operation. In some embodiments, the input signal system comprises at least one of a mobile device or a real-time sensor, which may be also referred to as any real-time computing means in some embodiments.

In some embodiments, the input signal may comprise payment information. In some embodiments, the input hardware may comprise a card such as a payment card, an identification card, a loyalty card, etc., or a device such as a payment device, or mobile device such as a mobile phone or watch. In some embodiments, the first computing operation may comprise a loyalty processing operation, and the second computing operation may comprise a payment or a transaction processing operation. In some embodiments, the identification database may be associated with a loyalty program. In some embodiments, the second identification signal may be referred to as a loyalty token or loyalty identification number. In some embodiments, the identification signal may comprise identification information associated with the input signal or associated with a user of the input signal system. In some embodiments, the sensor may comprise or be associated with a display that displays an amount. In some embodiments, the amount may be displayed on the display upon receiving information associated with a product or service to be purchased. In some embodiments, the transformational attribute as described previously may be applied to the amount, and the discounted amount may be displayed on the display.

The present disclosure provides several important technical advantages that will be readily apparent to one skilled in the art from the figures, descriptions, and claims. Moreover, while specific advantages have been enumerated above, various embodiments may include an, some, or none of the enumerated advantages.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s, and their equivalents, that are protected thereby. In all instances, the scope of such claims shall be considered on their own merits in light of this disclosure, but should not be constrained by the headings herein.

What is claimed is:

1. A method for initially registering a new consumer in a consumer program at a point-of-sale terminal, the method comprising:
    receiving, from the point-of-sale terminal, at a computer-server connected to a network, a token representing a form of payment of the consumer used in a transaction initiated by the consumer at the point-of-sale terminal, wherein the token further comprises data representing consumer information available to the point-of-sale terminal;
    comparing only the token with a database of the consumer program storing prior tokens to determine if there is at least a partial match of the consumer information among any of the prior tokens stored in the database, and, if it is determined the token has no at least partial match among the prior tokens stored in the database of the consumer program associated with the computer-server, then, automatically linking, by the computer-server, the token with the consumer program to register the consumer in the consumer program; and;
    storing the token in the database as a new prior token, wherein upon a subsequent transaction by the consumer, a reward is automatically applied during the subsequent transaction in response to the computer-server determining a partial match of the new prior token with a token received during the subsequent transaction.

2. The method of claim 1, further comprising, in response to receiving the token, determining, with the computer-server, if the token is not registered with the consumer program associated with the computer-server by determining whether the token fully matches any of the prior tokens, and if the token does not fully match any of the prior tokens, performing the automatic linkage of information to register the consumer in the consumer program.

3. The method of claim 1, wherein the form of payment is selected from the group consisting of: credit cards, debit cards, electronic payment accounts, consumer billing systems, cell-phone-based electronic payment systems, and PDA-based electronic communication systems.

4. The method of claim 1, further comprising transmitting instructions, across the network from the computer-server to the point-of-sale terminal, to apply consumer rewards to the transaction initiated by the consumer at the merchant associated with the consumer program.

5. The method of claim 4, further comprising storing, with the computer-server, transaction information in the database to track the consumer rewards applied to the transaction initiated by the consumer.

6. The method of claim 1, wherein the consumer program is a consumer loyalty reward program associated with the merchant.

7. A system for initially registering a new consumer in a consumer program at a point-of-sale terminal, the system comprising:
    a computer-server connected to a network and in communication with the point-of-sale terminal; and
    a database in communication with the computer-server for storing consumer information regarding the consumer program;
    wherein the computer-server is operable to:
        receive, across the network from the point-of-sale terminal, a token representing a form of payment used by the new consumer in a transaction initiated by the new consumer at the point-of-sale terminal, wherein the token further comprises customer information available to the point-of-sale terminal from the form of payment;
        compare only the token with the consumer information stored in the database to determine if there is at least a partial match of the token with any of the consumer information stored in the database, and, if it is determined the token does not at least partially match any of the consumer information, then, automatically link the token with the consumer program to register the new consumer in the consumer program; and and
        store the token as a new consumer information record for the new consumer in the database wherein upon a subsequent transaction by the new consumer, a reward is automatically applied in response to the computer-server determining a partial match of the new consumer information record with a token received during the subsequent transaction.

8. The system of claim 7, wherein the computer-server is further operable to determine if the token is not registered with a consumer program associated with the computer-server by determining whether the token fully matches any of the consumer information stored in the database, and if the token does not fully match any of the consumer information, then, automatically register the new consumer in the consumer program.

9. The system of claim 7, wherein the form of payment is selected from the group consisting of: credit cards, debit cards, electronic payment accounts, consumer billing systems, cell-phone-based electronic payment systems, and PDA-based electronic communication systems.

10. The system of claim 7, wherein the computer-server is further operable to transmit instructions, across the network to the point-of-sale terminal, to apply consumer rewards to the transaction initiated by the consumer at the merchant associated with the consumer program.

11. The system of claim 10, wherein the computer-server is further operable to store transaction information in the database to track the consumer rewards applied to the transaction initiated by the consumer.

12. The system of claim 7, wherein the consumer program is a consumer loyalty reward program associated with the merchant.

13. The method of claim 1, wherein the point-of-sale terminal generates the token.

14. The method of claim 1, wherein the reward comprises a point system configured to generate a redeemable monetary value upon exceeding a threshold of points.

15. The method of claim 14, wherein the monetary value is a percentage discount applied to a transaction amount during the subsequent transaction.

16. The method of claim 1, further comprising prompting the customer, at the point-of-sale terminal, prior to automatically linking the token with the consumer program, wherein the prompt informs the customer of terms for the consumer program.

17. The method of claim 16, wherein, in response to the prompt, the customer must confirm registration, at the point-of-sale terminal, prior to automatically linking the token with the consumer program.

18. The system of claim 7, wherein the point-of-sale terminal generates the token.

19. The system of claim 7, wherein the reward comprises a point system configured to generate a redeemable monetary value upon exceeding a threshold of points.

20. The system of claim 19, wherein the monetary value is a percentage discount applied to a transaction amount during the subsequent transaction.

\* \* \* \* \*